US008989157B2

(12) United States Patent
Ishida et al.

(10) Patent No.: US 8,989,157 B2
(45) Date of Patent: Mar. 24, 2015

(54) RADIO COMMUNICATION SYSTEM, BASE STATION, AND INTERFERENCE MANAGEMENT SCHEME

(71) Applicant: Hitachi, Ltd., Tokyo (JP)

(72) Inventors: Hitoshi Ishida, Yokohama (JP); Kenzaburo Fujishima, Yokohama (JP); Yunjian Jia, Jyukei-shi (CN)

(73) Assignee: Hitachi, Ltd., Tokyo (JP)

( * ) Notice: Subject to any disclaimer, the term of this patent is extended or adjusted under 35 U.S.C. 154(b) by 124 days.

(21) Appl. No.: 13/779,075

(22) Filed: Feb. 27, 2013

(65) Prior Publication Data

US 2013/0272274 A1 Oct. 17, 2013

(30) Foreign Application Priority Data

Apr. 12, 2012 (JP) ................................ 2012-090627

(51) Int. Cl.

| | |
|---|---|
| ***H04W 4/00*** | (2009.01) |
| ***H04W 72/08*** | (2009.01) |
| ***H04W 72/04*** | (2009.01) |
| *H04L 5/00* | (2006.01) |

(52) U.S. Cl.

CPC ........ *H04W 72/082* (2013.01); *H04W 72/0426* (2013.01); *H04W 72/08* (2013.01); *H04L 5/0035* (2013.01)

USPC ........................... 370/336; 370/338; 370/329

(58) Field of Classification Search

CPC ............. H04W 72/082; H04W 72/08; H04W 72/1278; H04W 72/0493; H04W 16/14; H04W 84/045; H04L 5/0035

USPC ............. 370/252–338; 455/63.1, 424, 426.1, 455/452.2, 450, 466, 436, 501

See application file for complete search history.

(56) References Cited

U.S. PATENT DOCUMENTS

2008/0233948 A1* 9/2008 Kazmi et al. ................. 455/423
2011/0201277 A1 8/2011 Eguchi
2012/0142339 A1* 6/2012 Duan ........................... 455/424
2012/0295546 A1* 11/2012 Fujito ......................... 455/63.1
2013/0250871 A1* 9/2013 Kaukovuori et al. ......... 370/329
2014/0031031 A1* 1/2014 Gauvreau et al. .......... 455/426.1
2014/0119359 A1* 5/2014 Horneman et al. .......... 370/338

FOREIGN PATENT DOCUMENTS

JP 2010-114778 A 5/2010

OTHER PUBLICATIONS

"X2 application Protocol (X2AP) (Release 10)"; 3GPP TS 36.423, Ver. 10.3.0.30; pp. 68-70 and 72; Sep. 2011.

"Overall Description: Stage 2 (Release 10)"; 3GPP TS 36.300; Ver. 10.5.0; pp. 116-117; Sep. 2011.

R3-103336, Almost Blank Subframe Request from Pico to Macro eNB; Alcatel-Lucent Shanghai Bell, Alcatel-Lucent, 3GPP TSG RAN WG3 #70 Meeting; Nov. 2010.

* cited by examiner

*Primary Examiner* — Afsar M Qureshi
(74) *Attorney, Agent, or Firm* — Mattingly & Malur, PC

(57) ABSTRACT

In an environment in which a macro base station and a low transmission power base station exist, the ratio of the interference reduction time period of the macro base station is optimized, and the throughput of the low transmission power base station is improved, while minimizing a reduction in throughput. The macro base station causes a high interference to other base stations and one or a plurality of low power nodes (LPN) subjected to interference from the macro base station. The macro base station sets first and second data transmission time periods and then determines the ratio of the second time period and the pattern of the first time period and the second time period based on communication quality in the first time period and communication quality in the second time period of the macro base station and the LPN.

15 Claims, 31 Drawing Sheets

FIG. 7

| | | ABS RATIO | | | | |
|---|---|---|---|---|---|---|
| | | 0 | 0.1 | 0.2 | ··· | 1.0 |
| LPN USER ID | 1 | 1.0 (Mbps) | 2.0 | 4.0 | ··· | 5.0 |
| | 2 | 2.5 | 2.75 | 3 | ··· | 3.5 |
| | ··· | ··· | | | | |
| | $U_L$ | 3.0 | 4.0 | 5.0 | ··· | 7.0 |

*FIG. 10*

| | | ABS RATIO | | | | |
|---|---|---|---|---|---|---|
| | | 0 | 0.1 | 0.2 | ··· | 1.0 |
| MACRO USER ID | 1 | 5.0 (Mbps) | 4.5 | 4.0 | ··· | 0.0 |
| | 2 | 3.0 | 2.7 | 2.4 | ··· | 0.0 |
| | ··· | ··· | | | | |
| | $U_M$ | 4.0 | 3.6 | 3.2 | ··· | 0.0 |

FIG. 12

| SUB FRAME # | ABS/ NORMAL | EVALUATION FUNCTION 2-2a | EVALUATION FUNCTION 2-2b | INSTANTANEOUS THROUGHPUT 2-2a | INSTANTANEOUS THROUGHPUT 2-2b | TOTAL TRANSMITTED DATA 2-2a | TOTAL TRANSMITTED DATA 2-2b | * AVERAGE THROUGHPUT 2-2a | * AVERAGE THROUGHPUT 2-2b | ALLOCATED USER ID |
|---|---|---|---|---|---|---|---|---|---|---|
| 0 | ABS | N/A | N/A | 10 | 7 | 0 | 0 | 0 | 0 | 2-2a |
| 1 | NORMAL | 0.2 | N/A | 2 | 5 | 10 | 0 | 10 | 0 | 2-2b |
| 2 | NORMAL | 0.4 | **2** | 2 | 5 | 10 | 5 | 5 | 2.5 | 2-2b |
| 3 | NORMAL | 0.6 | **1.5** | 2 | 5 | 10 | 10 | 3.333333 | 3.333333 | 2-2b |
| 4 | ABS | **4.0** | 1.866667 | 10 | 7 | 10 | 15 | 2.5 | 3.75 | 2-2a |
| 5 | NORMAL | 0.5 | **1.666667** | 2 | 5 | 20 | 15 | 4 | 3 | 2-2b |
| 6 | NORMAL | 0.6 | **1.5** | 2 | 5 | 20 | 20 | 3.333333 | 3.333333 | 2-2b |
| 7 | NORMAL | 0.7 | **1.4** | 2 | 5 | 20 | 25 | 2.857143 | 3.571429 | 2-2b |
| 8 | ABS | **4.0** | 1.866667 | 10 | 7 | 20 | 30 | 2.5 | 3.75 | 2-2a |
| 9 | NORMAL | 0.6 | **1.5** | 2 | 5 | 30 | 30 | 3.333333 | 3.333333 | 2-2b |
| 10 | NORMAL | 0.666667 | **1.428571** | 2 | 5 | 30 | 35 | 3 | 3.5 | 2-2b |
| 11 | NORMAL | 0.733333 | **1.375** | 2 | 5 | 30 | 40 | 2.727273 | 3.636364 | 2-2b |
| ... | ... | ... | ... | ... | ... | ... | ... | ... | ... | ... |
| 999 | NORMAL | 0.7992 | **1.333778** | 2 | 5 | 2500 | 3745 | 2.502503 | 3.748749 | 2-2b |
| 1000 | ABS | **4.0** | 1.866667 | 10 | 7 | 2500 | 3750 | 2.5 | 3.75 | 2-2a |
| * AVERAGE THROUGHPUT DOES NOT INCLUDE THE ALLOCATED DATA IN THE SUBFRAME | | | | | | | | | $C_{A,a}=10$ | $C_{A,b}=7$ |
| | | | | | | | | | $C_{N,a}=2$ | $C_{N,b}=5$ |
| | | | | | | | | | $\Delta_a=5$ | $\Delta_b=1.4$ |

CASE 1: $0 \leq r_{ABS} \leq$ THRESHOLD 1

LPN USER 2-2a: BOTH ABS AND NORMAL SUBFRAME ARE ALLOCATED

LPN USER 2-2b: ONLY NORMAL SUBFRAME IS ALLOCATED

EVALUATION FUNCTION AT ABS: $CostA_a \geq CostA_b$

EVALUATION FUNCTION AT NORMAL: $CostN_a = CostN_b$

CASE 3: THRESHOLD 2 ≤ $r_{ABS}$ ≤ 1.0
LPN USER 2-2a: ONLY ABS IS ALLOCATED
LPN USER 2-2b: BOTH ABS AND NORMAL SUBFRAME ARE ALLOCATED

EVALUATION FUNCTION AT ABS: $CostA_a = CostA_b$
EVALUATION FUNCTION AT NORMAL: $CostN_a \leq CostN_b$

*FIG. 14B*

| LPN USER ID | $C_{N,u}$ | $C_{A,u}$ | $\Delta_u$ |
|---|---|---|---|
| 1 | 1 | 11 | 11 |
| 2 | 2 | 12 | 6 |
| 3 | 3 | 13 | 4.333333 |
| 4 | 4 | 14 | 3.5 |
| 5 | 5 | 15 | 3 |
| 6 | 6 | 16 | 2.666667 |
| 7 | 7 | 17 | 2.428571 |
| 8 | 8 | 18 | 2.25 |
| 9 | 9 | 19 | 2.111111 |
| 10 | 10 | 20 | 2 |

| MACRO USER ID | $C_{N,u}$ | $C_{A,u}$ | $\Delta_u$ |
|---|---|---|---|
| 1 | 11 | 1E-10 | 9.09E-12 |
| 2 | 12 | 1E-10 | 8.33E-12 |
| 3 | 13 | 1E-10 | 7.69E-12 |
| 4 | 14 | 1E-10 | 7.14E-12 |
| 5 | 15 | 1E-10 | 6.67E-12 |
| 6 | 16 | 1E-10 | 6.25E-12 |
| 7 | 17 | 1E-10 | 5.88E-12 |
| 8 | 18 | 1E-10 | 5.56E-12 |
| 9 | 19 | 1E-10 | 5.26E-12 |
| 10 | 20 | 1E-10 | 5E-12 |

| MACRO USER ID | $C_{N,u}$ | $C_{A,u}$ | $\Delta_u$ |
|---|---|---|---|
| 1 | 20 | 10 | 0.5 |
| 2 | 19 | 9 | 0.473684 |
| 3 | 18 | 8 | 0.444444 |
| 4 | 17 | 7 | 0.411765 |
| 5 | 16 | 6 | 0.375 |
| 6 | 15 | 5 | 0.333333 |
| 7 | 14 | 4 | 0.285714 |
| 8 | 13 | 3 | 0.230769 |
| 9 | 12 | 2 | 0.166667 |
| 10 | 11 | 1 | 0.090909 |

| LPN USER ID | NORMAL SUBFRAME CQI $C_{N,u}$ | ABS CQI $C_{A,u}$ |
|---|---|---|
| 1 | 1.0 (bps/Hz) | 11.0 (bps/Hz) |
| 2 | 2.0 | 12.0 |
| 3 | 3.0 | 13.0 |
| 4 | 4.0 | 14.0 |
| 5 | 5.0 | 15.0 |
| 6 | 6.0 | 16.0 |
| 7 | 7.0 | 17.0 |
| 8 | 8.0 | 18.0 |
| 9 | 9.0 | 19.0 |
| 10 | 10.0 | 20.0 |

FIG. 24

| | ABS RATIO | | | | |
|---|---|---|---|---|---|
| | 0 | 0.1 | 0.2 | ··· | 1.0 |
| THE NUMBER OF USERS SATISFY QoS | 4 | 6 | 10 | ··· | 10 |
| THE NUMBER OF CONNECTED USERS | | | | | 10 |

RADIO COMMUNICATION SYSTEM, BASE STATION, AND INTERFERENCE MANAGEMENT SCHEME

CLAIM OF PRIORITY

The present invention claims priority from Japanese Patent Application JP2012-090627 filed on Apr. 12, 2012, the content of which is hereby incorporated by reference.

BACKGROUND OF THE INVENTION

The present invention relates to an interference control technique between base stations in a wireless communication system.

In these years, wireless communication systems in compliance with the LTE (Long Term Evolution) standard whose maximum communication speed exceeds 100 Mbit/s begin to put to practical use. In LTE, multipath resistance is improved using OFDMA (Orthogonal Frequency Division multiple Access) for downlink access and SC-FDMA (Single Carrier-Frequency Division Multiple Access) for uplink access, and spectrum efficiency is improved by introducing MIMO (Multiple-Input Multiple-Output) transmission in which a transmitter receiver uses a plurality of antennas.

In a cellular system, a communication area covered by a base station is called a cell. A base station whose transmission power is large and that covers a broad communication area is called a macro base station, and the communication area of the macro base station is called a macro cell. In the cellular system, macro base stations are distributed and disposed in a service area, so that a fewer number of base stations cover a broad area in the overall system. However, there are areas to which radio waves from a macro base station are hardly delivered in underground areas, upper stories of buildings, and areas behind buildings, for example. These areas are called blind zones. In addition to this, in these years, because of the spread of smartphones, wireless traffic is rapidly increased, and it becomes difficult to accommodate wireless traffic using only macro base stations.

For the purposes of elimination of these blind zones and off-loading traffic in macro base stations, small-sized base stations such as a pico base station and a femto base station are disposed whose transmission power and communication area are small. The communication areas of these small-sized base stations are called a pico cell and a femto cell, for example. A network topology in which base stations with small transmission power (Low Power Node: LPN) such as a pico base station and a femto base station are disposed in the communication area (the macro cell) of a macro base station is called a Heterogeneous Network (HetNet). Various studies are conducted on a point that interference from a macro base station with a large transmission power greatly degrades the communication quality of users connected to the LPN, which is a technical problem of the HetNet.

BRIEF SUMMARY OF THE INVENTION

As illustrated in FIG. 1, in the HetNet described above, base station LPNs 3 with small transmission power such as a pico base station 3-1 and a femto base station 3-2 are disposed in the communication area (the macro cell) of a macro base station 1. A distributed antenna system 3-3, for example, can be considered to be one of the LPNs 3 in the case where transmission power for individual antennas is small. Moreover, a user connected to the macro base station 1 is called a macro user 2-1, and a user connected to the LPN 3 is called an LPN user 2-2.

In the HetNet illustrated in FIG. 1, signals transmitted from the macro base station 1 arrive as interference signals at the LPN user 2-2. Since the transmission power of the macro base station 1 is larger than the transmission power of the LPN 3, such interference from the macro base station 1 is a cause to greatly degrade the communication quality of the LPN user 2-2. In the LTE-Advanced standard, which is the advanced standard of LTE, the enhanced Inter Cell Interference Coordination (eICIC) is introduced as a technique to reduce the interference from the macro base station 1. In the eICIC, such a time period is provided in which the macro base station 1 does not transmit data, or the macro base station 1 reduces transmission power. This time period is called an almost blank subframe (ABS).

FIG. 2 shows exemplary settings of the ABS pattern of the macro base station 1. In FDD, the ABS is set in the unit of 40 subframes, and informed in a bitmap format of 40 bits from the macro base station 1 to the LPN 3. In "X2 application Protocol (X2AP) (Release 10)" (3GPP TS 36.423, Ver. 10.3.0.30, pp. 68-70 and 72, September 2011), this information is called ABS Pattern Info. In the following, the ABS Pattern Info is described as an ABS pattern. In an ABS pattern 20-1, one bit indicates whether the subframe is an almost blank subframe. A value "1" indicates that the macro base station 1 is in the ABS. A value "0" indicates that the macro base station 1 is in a normal subframe (NS) in which the macro base station 1 transmits data at general transmission power. The ABS pattern 20-1 is repeated at a 40-subframe period.

The LPN user 2-2 is to be subjected to a high interference from the macro base station 1 in the normal subframe that is a first time period, whereas as illustrated in a pattern 20-3, the interference power from the macro base station 1 is greatly reduced in the ABS that is a second time period. As a result, the throughput of the LPN 3 can be improved. This technique is disclosed in "Overall Description: Stage 2 (Release 10)" (3GPP TS 36.300, Ver. 10.5.0, pp. 116-117, September 2011), for example. Since the interference from the macro base station 1 to the LPN user 2-2 is reduced using the ABS as described above, the throughput of the LPN user 2-2 is improved.

On the other hand, as illustrated in a pattern 20-2, the macro base station 1 stops transmitting data to the macro user 2-1, or reduces transmission power in the ABS. Thus, the ABS is used to reduce a time resource that the macro base station 1 can use, or to reduce the desired signal power of the macro base station 1. As a result, the more increased an ABS ratio occupied in the total time period is, the more reduced the throughput of the macro user 2-1 is. Therefore, desirably, the ABS ratio is set to a minimum necessary amount. For example, desirably, such an ABS ratio is set that the average throughput of all the users including the macro user 2-1 and the LPN user 2-2 is at the maximum.

In "X2 application Protocol (X2AP) (Release 10)," in order to determine the ABS ratio and the ABS pattern by the macro base station 1, the ABS resource usage ratio of the LPN 3 is specified as information provided from the LPN 3 to the macro base station 1 (it is called a DL ABS status). This information is expressed by an integer of 0 to 100%. The information is used, so that the macro base station 1 can perform the following operation in which the macro base station 1 increases the ABS when the ABS resource usage ratio is 100%, for example, the macro base station 1 reduces the ABS when the ratio is 50%, the macro base station 1 does not change the ABS when the ratio is 70%, and so on. However, this information does not indicate how much the ABS resource usage ratio of the LPN 3 is changed as a consequence that the macro base station 1 increases or decreases the ABS.

In "R3-103336, Almost Blank Subframe Request from Pico to Macro eNB," (Alcatel-Lucent Shanghai Bell, Alcatel-Lucent, 3GPP TSG RAN WG3 #70 Meeting, November 2010), a method is disclosed in which a pico base station 3-1 informs an ABS ratio requested by the pico base station 3-1 to a macro base station 1. For the pico base station 3-1, since the throughput of the pico base station 3-1 is increased as the number of almost blank subframes is larger, the optimum ABS ratio is 100%. Therefore, the pico base station 3-1 is to request a larger number of almost blank subframes if no criteria are provided. However, clear criteria to determine the ABS ratio requested by the pico base station 3-1 are not disclosed.

Moreover, in Japanese Patent Application Laid-Open Publication No. 2010-114778, an interference control method is disclosed in which transmission of a frequency resource is stopped. In Japanese Patent Application Laid-Open Publication No. 2010-114778, a user reports information about a subband whose subband channel quality indicator (CQI) is at a threshold or less and the information is informed from a base station subjected to interference to a neighboring base station causing the interference. The neighboring base station receives this information, and stops transmission in the subband, or reduces transmission power. However, it is difficult to grasp how much the throughput of the base station subjected to interference is improved and how much the throughput of the neighboring base station is reduced by stopping transmission or reducing transmission power only using the information about the subband whose subband CQI is at a threshold or less.

From the description above, in the existing setting method for an ABS pattern and the existing interference control method, there is no method in which the macro base station 1 acquires information necessary to appropriately set the ABS pattern. As a result, it is likely that the macro base station 1 excessively sets almost blank subframes to cause a reduction in the throughput of the macro base station 1. Alternatively, it is likely to cause a reduction in the throughput of the LPN 3 because the number of almost blank subframes of the macro base station 1 is small and a sufficient interference reduction effect is not provided for the LPN 3.

It is an object of the present invention to provide a wireless communication system, a base station, and an interference control method that solve the problems above and an ABS pattern is appropriately set in a HetNet environment to improve the throughput of an LPN while minimizing a reduction in the throughput of a macro base station.

In order to achieve the object, the present invention is to provide a wireless communication system including: a first base station causing interference to other base stations; one or a plurality of second base stations subjected to interference from the first base station; a setting unit configured to set a first time period and a second time period, the first time period in which the first base station transmits data, or transmits data in general transmission power, the second time period in which the first base station stops transmission of data, or reduces transmission power; and a determination unit configured to determine a ratio of the second time period based on communication quality in the first time period and communication quality in the second time period of a user connected to the first base station and the second base station.

Moreover, in order to achieve the object, the present invention is to provide a second base station subjected to interference from a first base station causing interference to other base stations. Based on communication quality in a first time period and communication quality in a second time period of a user connected to the second base station, the first time period in which the first base station transmits data, or transmits data in general transmission power, the second time period in which the first base station stops transmission of data, or reduces transmission power, the second base station calculates a ratio of the second time period and a throughput prediction value of the user connected to the second base station. The second base station informs, to the first base station, a relationship between a ratio of the second time period and a throughput prediction value of the user connected to the second base station.

Furthermore, in order to achieve the object, the present invention is to provide an interference control method for a first base station causing interference to other base stations. The first base station sets a first time period and a second time period, the first time period in which data is transmitted, or data is transmitted in general transmission power, the second time period in which transmission of data is stopped, or transmission power is reduced. The first base station informs, to a user connected to the first base station, one item or a plurality of items of information about a time period to measure communication quality in the second time period, transmission power of the first base station in the second time period, a ratio between transmission power for a reference signal of the first base station in the first time period and transmission power of the first base station in the second time period, and a reference signal to measure communication quality in the second time period. The first base station receives, from the user connected to the first base station, communication quality in the first time period and communication quality in the second time period measured based on the information at the user. The first base station performs scheduling of the user connected to the first base station based on the received communication quality in the first time period and communication quality in the second time period.

According to the aspects of the present invention, the time period in which interference from the macro base station, which is a first base station, to the LPN, which is a second base station, is optimized, so that the throughput of the LPN can be improved while minimizing a reduction in the throughput of the macro base station.

BRIEF DESCRIPTION OF THE DRAWINGS

FIG. 7 is a diagram of exemplary throughput prediction values reported from an LPN to a macro base station according to the first embodiment;

FIG. 10 is a diagram of exemplary throughput prediction values of the macro user according to the first embodiment;

FIG. 12 is a diagram of exemplary scheduling results by PFS according to the first embodiment;

FIG. 14B is a diagram of an exemplary relationship between the ABS ratios and the throughput prediction values of LPN users according to the first embodiment;

FIG. 15B is a diagram of an exemplary relationship between ABS ratios and throughput prediction values of macro users in the case where the macro base station reduces transmission power to zero in almost blank subframes according to the first embodiment;

FIG. 16B is a diagram of an exemplary relationship between ABS ratios and throughput prediction values of macro users in the case where the macro base station reduces transmission power in almost blank subframes according to the first embodiment;

FIG. 20 is a diagram of exemplary channel quality indicators of an LPN user reported from an LPN to a macro base station according to the second embodiment;

FIG. 24 is a diagram of exemplary numbers of users to satisfy QoS reported from an LPN to a macro base station according to the fourth embodiment;

DETAILED DESCRIPTION OF THE INVENTION

In the following, various embodiments of the present invention will be described with reference to the drawings. In the description, the macro base station is sometimes referred to as a first base station, and the LPN is sometimes referred to as a second base station. Moreover, the normal subframe is sometimes referred to as a first time period, and the ABS is sometimes referred to as a second time period.

First, in order to clarify the difference between the present invention and existing systems, an existing system will be described.

Figure 3:
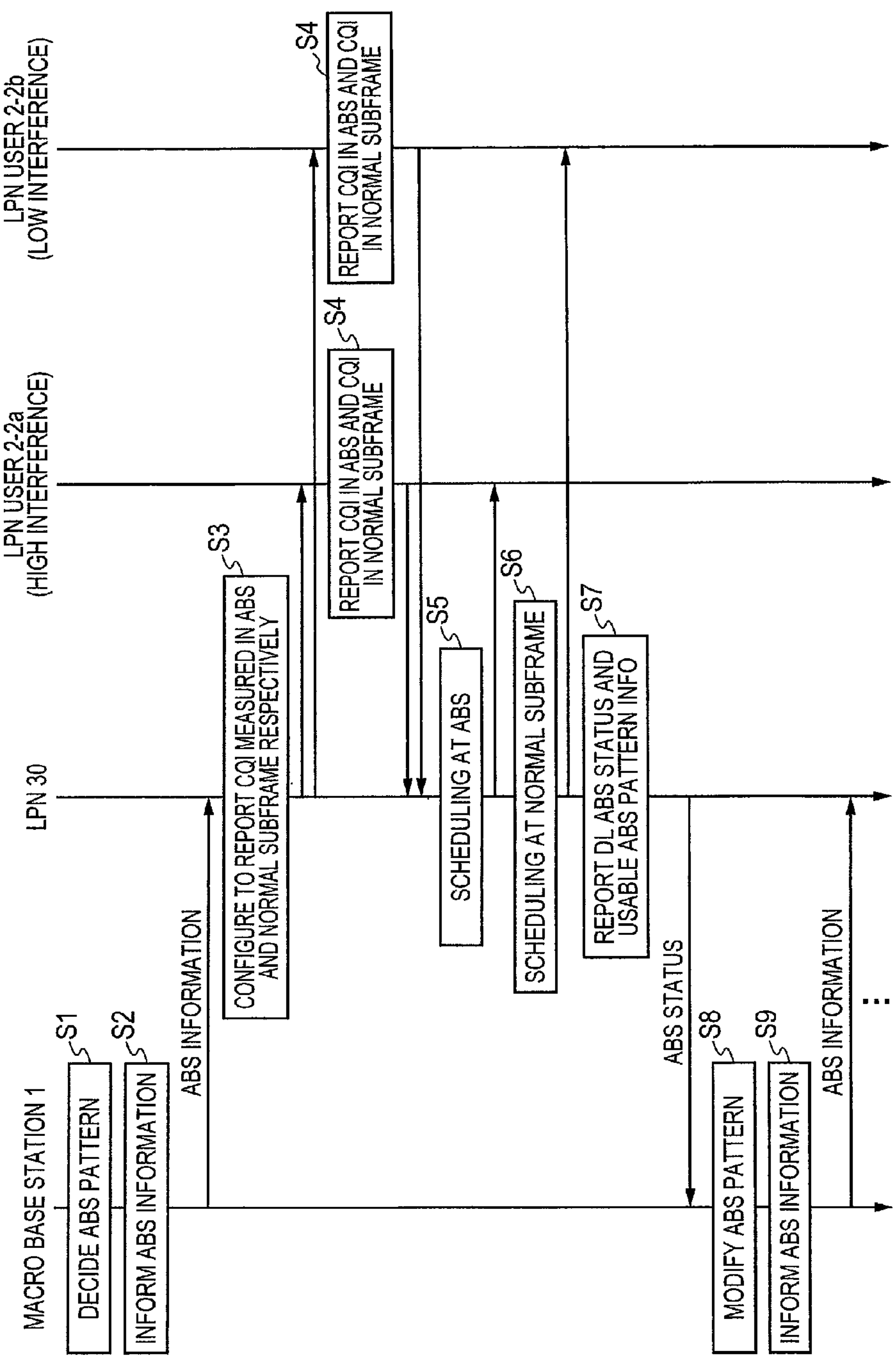
FIG. 3 is a diagram of an exemplary operation procedure of the HetNet in FIG. 1.

FIG. 3 is an exemplary operation procedure of an existing system when applying almost blank subframes. In FIG. 3, a user subjected to a high interference from a macro base station 1 is an LPN user 2-2_a_, and a user subjected to a small interference is an LPN user 2-2_b_. However, in the case where there is no need to distinguish between these users, the users are described as an LPN user 2-2.

The macro base station 1 decides an ABS pattern, that is, subframes to be almost blank subframes (S1), and informs information about the set ABS pattern to neighboring LPNs 3 (2). This information is called ABS information, and includes the number of antenna ports of the macro base station 1, for example, in addition to the ABS pattern. In the following, the information is called ABS information. The LPN 3 receives the ABS information, and configures the LPN user 2-2 to report two types of communication quality, channel quality indicators (CQI), in which subframes to be measured are restricted, based on the ABS information (S3) (see 116 page in "Overall Description: Stage 2 (Release 10)").

This information is configured of CQI measurement subframes in two patterns. The CQI measurement subframes are expressed in a 40-bit bitmap format similarly to the ABS Pattern Info. A value "1" means that the CQI is measured at a pertinent subframe, and a value "0" means that the CQI is not measured at a pertinent subframe. For example, one of the CQI measurement subframes may be restricted only to a subframe the same as the almost blank subframe of the macro base station 1, and the other may be restricted only to a subframe the same as the normal subframe of the macro base station 1. Moreover, the CQI, which is communication quality information, may include other items of information such as a precoding matrix indicator (PMI) that is the precoding matrix of MIMO and a rank indicator (RI) that is the number of transmittable MIMO layers, for example. In the following, the CQI is considered to also include items of information such as the PMI and the RI. Furthermore, the CQI is considered to also include the CQI for each subband and the CQI for each codeword.

The configured LPN user 2-2 measures two types of communication quality, CQI, in specified patterns, and reports the CQIs to the LPN 3 (S4). However, in FIG. 3, two types of CQIs are reported at a time. Reports may be provided in such a way that timing to provide a report and a resource to use are separately provided between the ABS CQI and the normal subframe CQI, for example. In Steps S3 and S4, the LPN 3 can acquire the CQI in the ABS and the CQI in the normal subframe of the LPN user 2-2. However, the LPN 3 may restrict the LPN user 2-2 to report two types of the CQIs to the LPN user 2-2_a_ subjected to a high interference from the macro base station 1 based on received power (RSRP: Reference Signal Received Power) or the like of the neighboring base stations separately reported from the LPN user 2-2.

The LPN 3 schedules the LPN user 2-2 in the ABS and the normal subframe based on two types of the CQIs reported from the LPN user 2-2. For scheduling, such a method is effective in which ABS resources are allocated in priority to the LPN user 2-2*a* subjected to a high interference power from the macro base station 1, as in Proportional Fairness Scheduling (PFS), for example. The LPN 3 schedules the LPN user 2-2*a* subjected to a high interference from the macro base station 1 in priority in the ABS using PFS or the like (S5). Moreover, the LPN 3 schedules the LPN user 2-2*b* subjected to a low interference from the macro base station 1 in priority in the normal subframe (S6).

The LPN 3 measures the ABS resource usage ratio (the DL ABS status) and the pattern of subframes actually used as the ABS (Usable ABS Pattern Info) in the case where a request is received from the macro base station 1, or on a regular basis, and reports them as an ABS status to the macro base station 1 (S7).

The macro base station 1 receives the ABS status and modifies the ABS pattern based on the information as necessary (S8), and informs the changed ABS information to the LPN 3 (S9).

Figure 1:
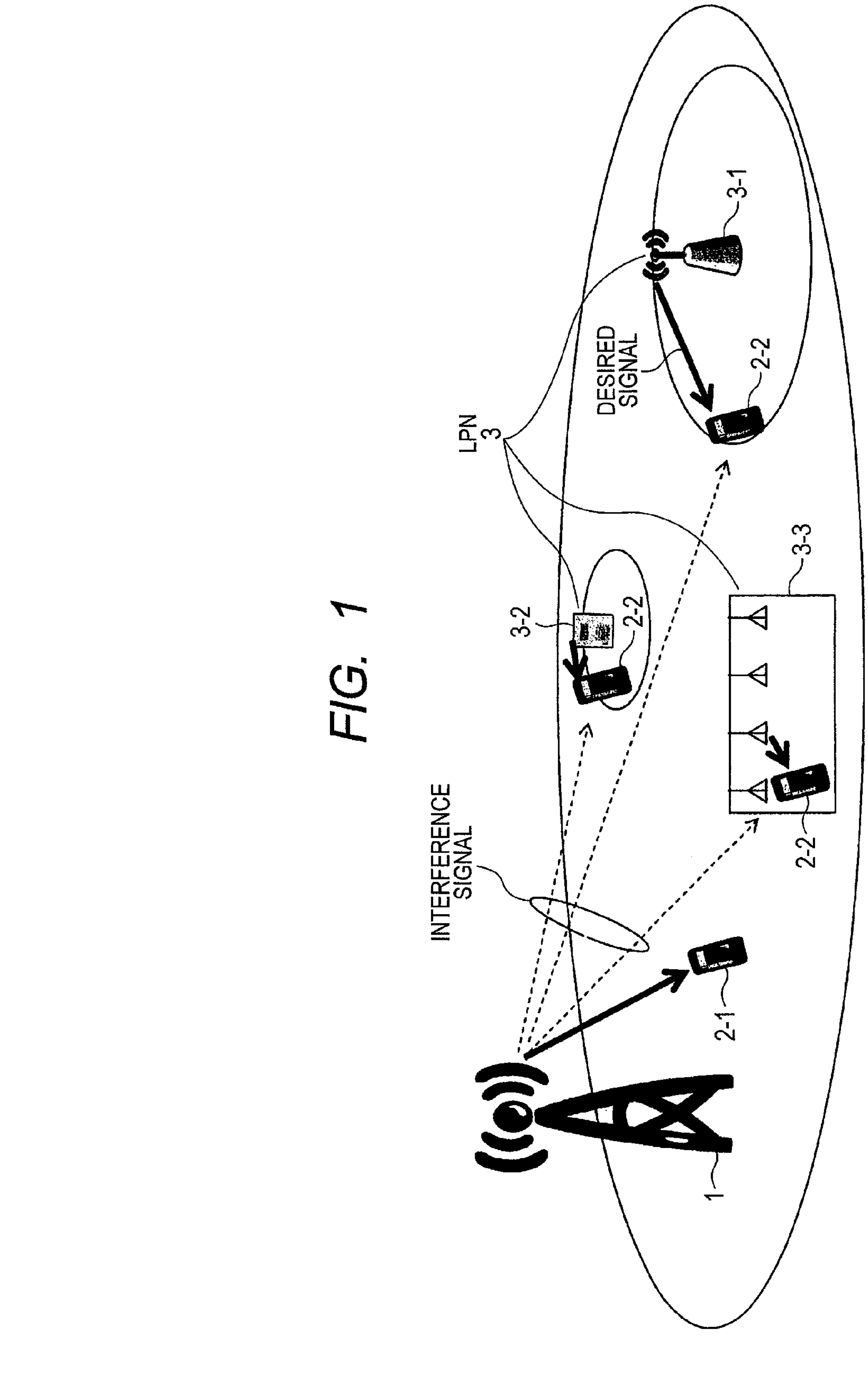
FIG. 1 is a diagram of an exemplary configuration of a HetNet to which the present invention is applied.
Figure 2:
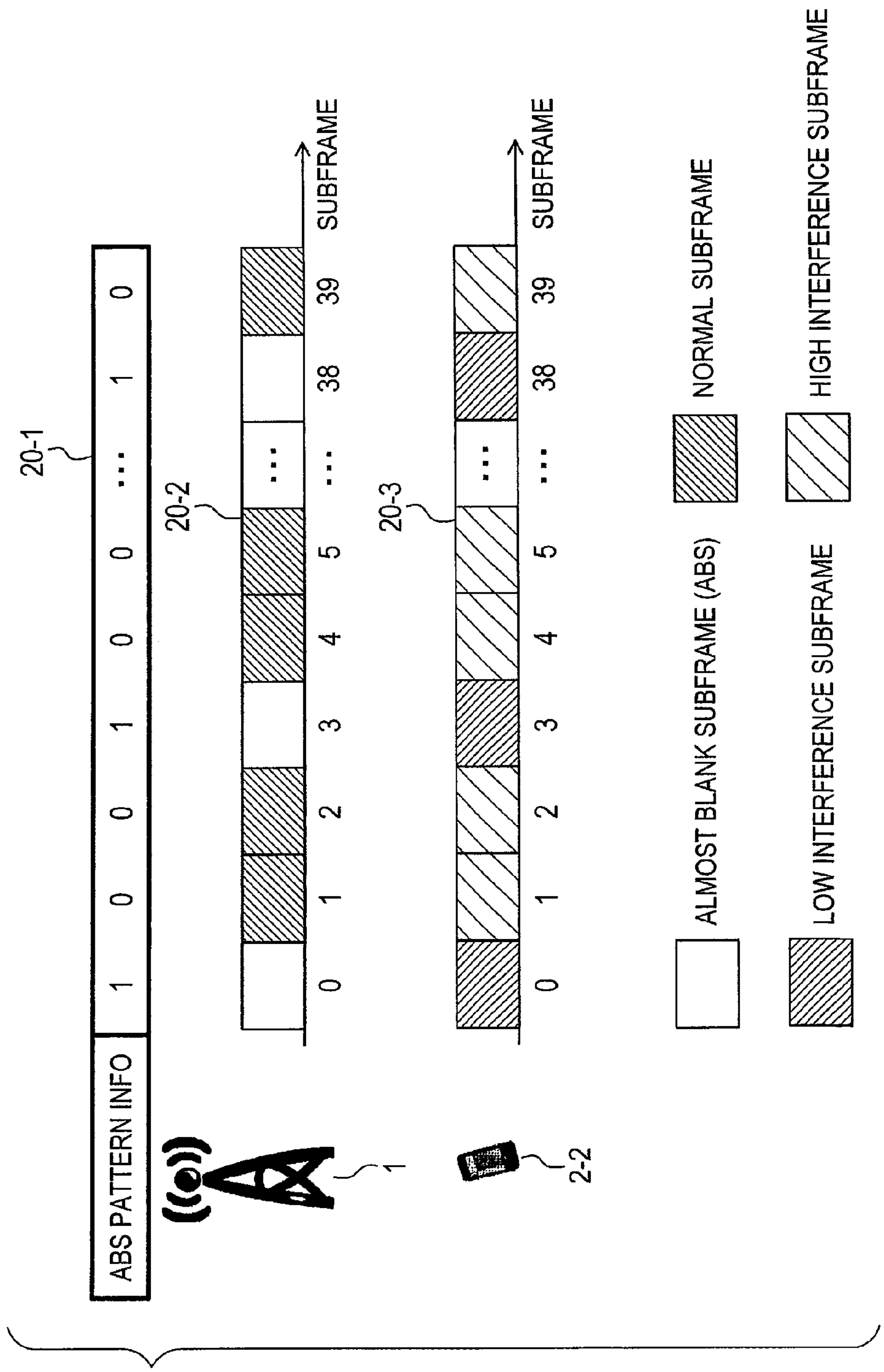
FIG. 2 is a diagram of exemplary ABS patterns of a macro base station in the HetNet in FIG. 1.
Figure 4:
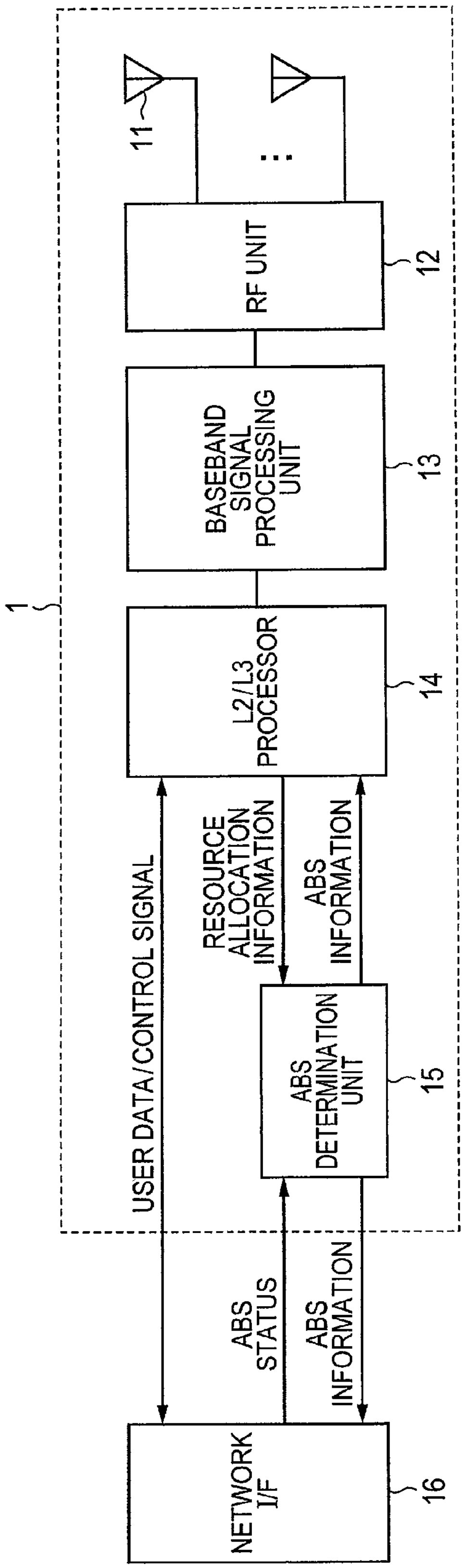
FIG. 4 is a diagram of an exemplary configuration of the macro base station in the HetNet in FIG. 1.

FIG. 4 is a block diagram of an exemplary configuration of the macro base station 1 in FIG. 1.

An antenna 11 transmits a downlink radio frequency (RF) signal transferred from an RF unit 12. Moreover, the antenna 11 receives an uplink RF signal transmitted from a user. The RF unit 12 converts a downlink baseband signal inputted from a baseband signal processing unit 13 into an RF signal, and transmits the signal through the antenna 11. Furthermore, the RF unit 12 converts the uplink RF signal inputted from the antenna 11 into a baseband signal, and inputs the signal to the baseband signal processing unit 13. The RF unit 12 also includes a power amplifier. In addition, the RF unit 12 may be formed in an RRH (Remote Radio Head) configuration in which the RF unit 12 is connected to the baseband signal processing unit 13 through cables such as an optical fiber.

The baseband signal processing unit 13 performs signal processing of downlink data of the users and the physical layer of a control signal inputted from the L2/L3 processor 14, generates the control signal of the physical layer, and performs signal processing of the uplink data and the physical layer of a control signal or the like inputted from the RF unit 12. More specifically, downlink signal processing includes error correction coding, rate matching, and modulation for the data signal and the control signal, MIMO signal processing such as layer mapping and precoding, mapping on resource elements, IFFT (Inverse Fast Fourier transform), and so on. The baseband signal processing unit 13 also generates a reference signal (RS) for use in channel estimation and in measuring the CQI and received power by the user, and performs insertion to resource elements, for example. The baseband signal generated by signal processing described above is transmitted to the RF unit 12. In uplink signal processing, the signal inputted from the RF unit 12 is subjected to FFT, demapping of resource elements, MIMO signal processing such as the multiplication of received MIMO weight and layer demapping, demodulation, and error correction decoding, for example. The baseband signal processing unit 13 also performs channel estimation, measurement of received power, and uplink CQI measurement using the uplink reference signal, for example. The decoded data signal and the control signal are transmitted to the L2/L3 processor 14.

The L2/L3 processor 14 is a processor that processes the Layer 2 and Layer 3 of the base station. The L2/L3 processor 14 stores, in a buffer, the data signals of the users transmitted from a gateway through a network I/F (Interface) 16 and control signals received from other base stations and a mobility management entity (MME), for example. Moreover, the L2/L3 processor 14 performs scheduling to determine users to communicate and time periods and frequency resources allocated to the users, the management of HARQ (Hybrid Automatic Repeat reQuest), processing packets, the concealment of wireless lines, and the generation of control signals to the users, for example. Furthermore, in scheduling, the L2/L3 processor 14 performs control in such a way that the transmission of the signal of the macro user 2-1 is stopped in the ABS based on ABS information informed from an ABS determination unit 15. Alternatively, the L2/L3 processor 14 performs control in such a way that the transmission power of the macro base station 1 is reduced in the ABS. In addition, the resource allocation information of the macro base station 1 may be informed to the ABS determination unit 15 for deciding the ABS pattern at the ABS determination unit 15.

The ABS determination unit 15 is a unit that decides the ABS pattern based on the ABS status informed from the LPN 3, ABS information, and the like of other macro base stations through the network I/F 16. The ABS determination unit 15 can be implemented using a processing unit such as a central processing unit (CPU), not shown. For a method of deciding the ABS pattern, such control can be considered by program processing at the CPU that in the case where the ABS resource usage ratio of the LPN 3 is greater than a threshold 1, for example, the ABS ratio is increased, in the case where the ABS resource usage ratio is smaller than a threshold 2, the ABS ratio is reduced, and in the case where the ABS resource usage ratio is at the threshold 1 and the threshold 2, the ABS ratio is not changed, for example. In addition to this, such control can also be considered that resource allocation information is acquired from the L2/L3 processor 14, and the ABS ratio is increased in the case where the resource usage ratio of the macro base station 1 is small, for example. The ABS pattern decided at the ABS determination unit 15 is informed to the neighboring LPNs 3 through the network I/F 16. Moreover, the ABS pattern is also informed to the L2/L3 processor 14.

The network I/F 16 is an interface through which the macro base station 1 connects to a core network via a back hole line. The macro base station 1 connects to the core network through the network I/F 16, so that the macro base station 1 can communicate with the gateway, the mobility management entity, and the other base stations.

Figure 5:
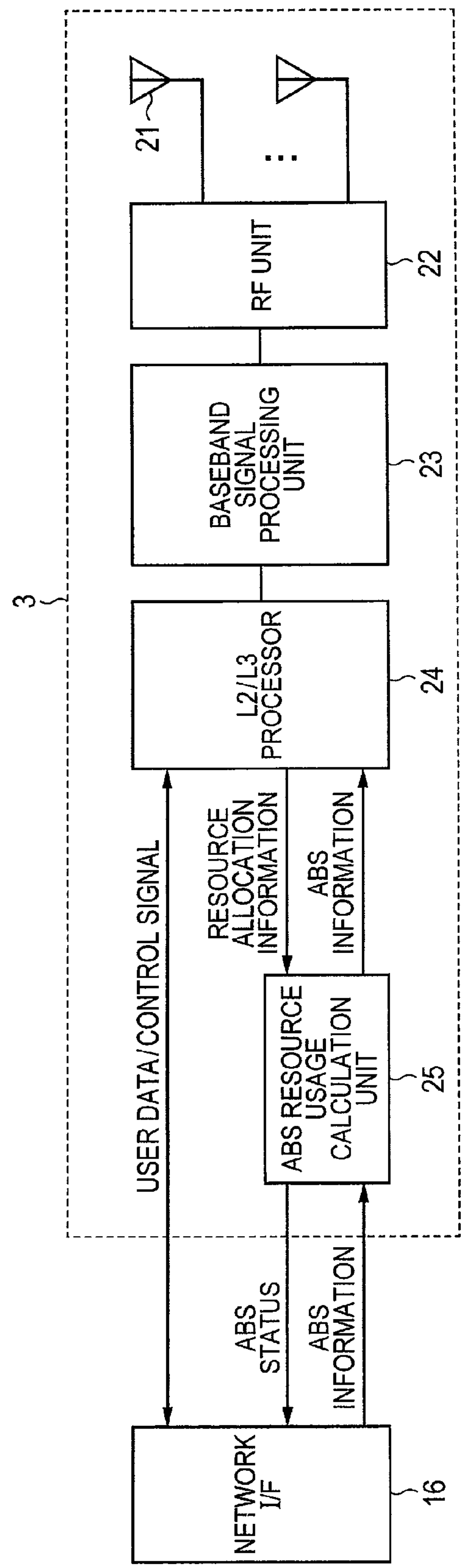
FIG. 5 is a diagram of an exemplary configuration of an LPN in the HetNet in FIG. 1.

FIG. 5 is an exemplary configuration of the LPN 3 in FIG. 1.

An antenna 21, an RF unit 22, and a baseband signal processing unit 23 are almost the same as those of the macro base station 1 in FIG. 4. Also for an L2/L3 processor 24, the basic functionality is the same as in the macro base station 1. There are two large different points. The first point is in that as illustrated in Step S3 in FIG. 3, the LPN user 2-2 is configured to measure the CQI in two patterns based on the ABS pattern of the macro base station 1. The second point is in that as illustrated in Steps S5 and S6 in FIG. 3, in scheduling at the LPN 3, scheduling is performed based on two types of the CQIs in the ABS and the normal subframe reported from the LPN user 2-2. Information about the ABS pattern is informed from the macro base station 1 to an ABS resource usage ratio calculation unit 25 through the network I/F 16, and transferred to the L2/L3 processor 14.

The ABS resource usage ratio calculation unit 25 is a unit that calculates the DL ABS status in Step S7 in FIG. 3, that is, the ABS resource usage ratio. The ABS resource usage ratio calculation unit 25 can be implemented by program processing at the CPU, for example, not shown. The ABS resource usage ratio calculation unit 25 receives resource allocation information from the L2/L3 processor 24, and calculates how much percentage of the resource block of the ABS resource is used. The ABS resource usage ratio calculation unit 25 then reports the information as an ABS status to the macro base station 1 through the network I/F 16.

In the existing system as described above, the ABS resource usage ratio of the LPN 3 is used in order to decide the ABS pattern, that is, the ABS ratio at the macro base station 1. However, this information does not indicate how much the ABS resource usage ratio of the LPN 3 is changed as a consequence that the macro base station 1 increases or decreases the ABS. Therefore, it is possible that the throughput of the macro base station 1 is reduced more than necessary because the ABS is excessively increased and that the throughput of the LPN 3 is reduced more than necessary because the ABS is excessively reduced.

First Embodiment

A first embodiment to address the problems will be described with reference to FIGS. 6 to 17.

Operation Procedure

Figure 6:
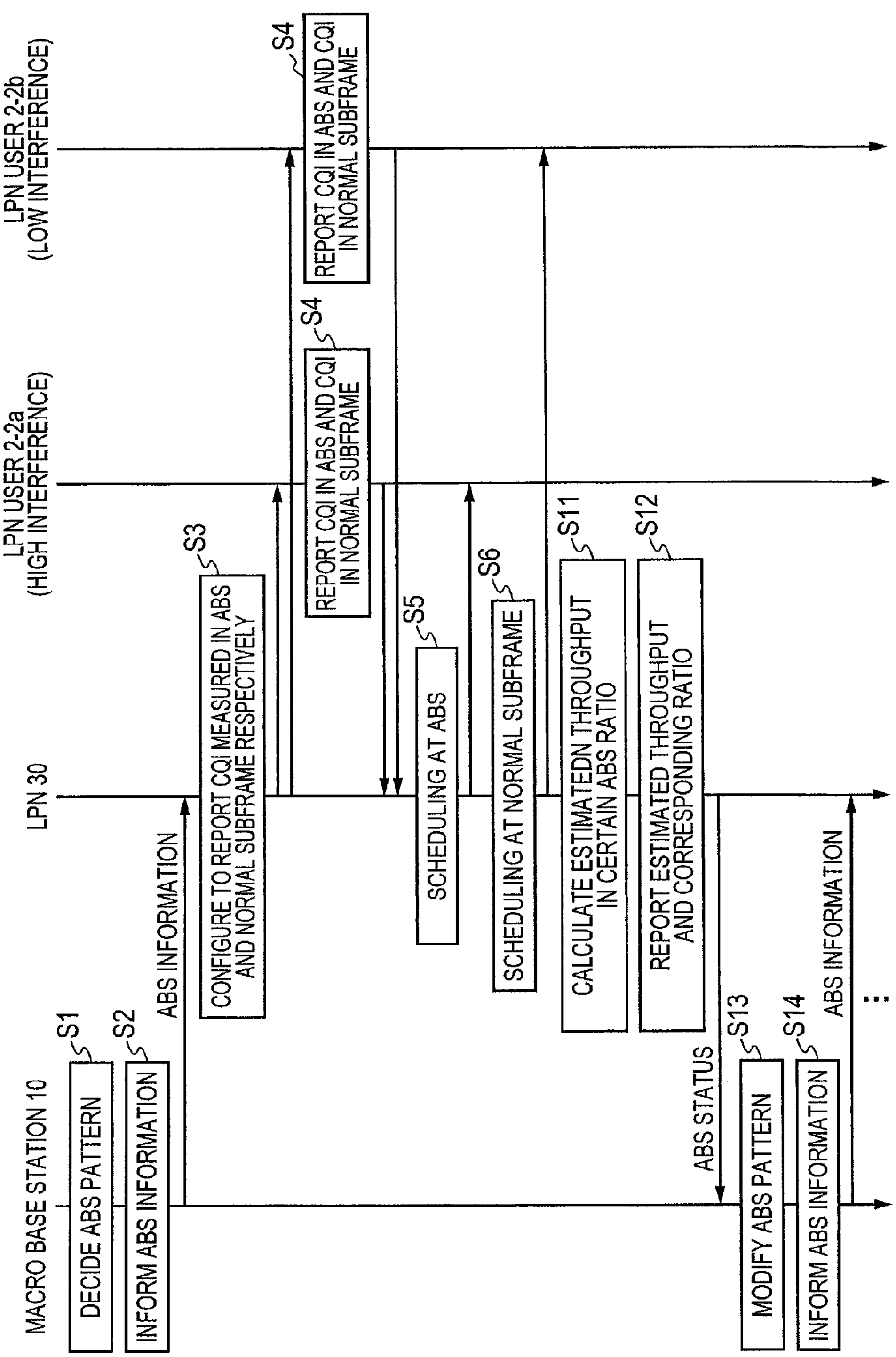
FIG. 6 is a diagram of an exemplary operation procedure according to a first embodiment.

FIG. 6 is an exemplary operation procedure according to the first embodiment. In the embodiment, numerals 10 and 30 are considered to be a macro base station and an LPN, respectively.

The procedures from Steps S1 to S6 in FIG. 6 are the same as the procedures in FIG. 3. Points different from the operations of the LPN 30 are the operations in Steps S11 and S12 in FIG. 3.

In Step S11, the processing unit of the LPN 30 uses the ABS CQI and the normal subframe CQI of the LPN users 2-2 acquired at Step S4 to calculate the relationship between the ABS ratio of the macro base station 10 and the throughput prediction values of the LPN users 2-2. In Step S12, the processing unit reports the calculated throughput prediction values of the LPN users 2-2 to the macro base station 10.

FIG. 7 is exemplary throughput prediction values reported from the LPN 30 to the macro base station 10 in Step S12 in FIG. 6. As illustrated in FIG. 7, the LPN 30 reports the correspondence between the IDs of the LPN users 2-2 and the throughput prediction values at the ABS ratios to the macro base station 10. The throughput is expressed in the unit of Mbps in FIG. 7. However, frequency use efficiency may be reported that the throughput is divided by the system bandwidth (bps/Hz). Alternatively, such a configuration may be possible in which throughput or spectrum efficiency is quantized into a few bits of information according to certain rules and the indexes are reported. Moreover, Steps S11 and S12 may be performed on a regular basis, or may be performed in the case where a request is received from the macro base station 10. A specific calculation method for the throughput prediction value will be described later.

Furthermore, in FIG. 7, the throughput prediction values of the LPN users 2-2 are reported for all the ABS ratios. However, a report may be provided only for throughput prediction values in the case where the ABS is increased or decreased from the present ABS ratio by a certain amount. Alternatively, such a configuration may be possible in which the macro base station 10 specifies the ABS ratio at which the prediction value is calculated and the LPN 30 reports only the throughput prediction value for the specified ABS ratio. In addition, a report may be provided for the average throughput prediction values of all the LPN users 2-2 connected to the LPN 30 and the prediction value for the minimum throughput, for example, not the throughput prediction values of the LPN users 2-2.

The macro base station 10 decides the ABS pattern using the throughput prediction values of the LPN users 2-2 for the ABS ratios reported from the LPN 30 and the throughput prediction value of the macro user 2-1 calculated from the CQI of the macro user 2-1 (S13). A specific determination method will be described later. In the case where the ABS pattern is modified, the macro base station 10 informs the changed ABS information to the neighboring LPNs 30 (S14). In the case where a plurality of LPNs 30 exist around the macro base station 10, the operation in FIG. 6 is performed on the LPNs 30. Moreover, the macro base station 10 may include a plurality of sectors.

Here, in the case where the macro base station 10 calculates the throughput prediction value of the macro user 2-1 from the CQI of the macro user 2-1, the CQI in the ABS and the CQI in the normal subframe of the macro user 2-1 are necessary. The operation in this case is different between the case where the macro base station 10 reduces transmission power for the data signal to zero in the ABS, that is, between the case where transmission is stopped and the case where transmission is not stopped. In the case where the macro base station 10 reduces transmission power to zero in the SAB, the CQI in the ABS of the macro user 2-1 may be zero. Therefore, it is unnecessary to cause the macro user 2-1 to provide a report. For the CQI in the normal subframe, the values reported from the macro user 2-1 may be used.

On the other hand, in the case where transmission power is reduced in the ABS, the CQI in the ABS of the macro user 2-1 is not always zero. For a method of calculating the CQI of the macro user 2-1 in the ABS, such a method can be considered in which an amount of the CQI reduced in the ABS is corrected on the macro base station 10 side from the CQI in the normal subframe and the difference in transmission power between the normal subframe and the ABS. Also in this case, the macro user 2-1 may report only the CQI in the normal subframe, and it is unnecessary to measure and report the CQI in the ABS.

For another method, such a method can be considered in which the CQI in the ABS is measured and reported to the macro base station 10 on the macro user 2-1 side.

Figure 8:
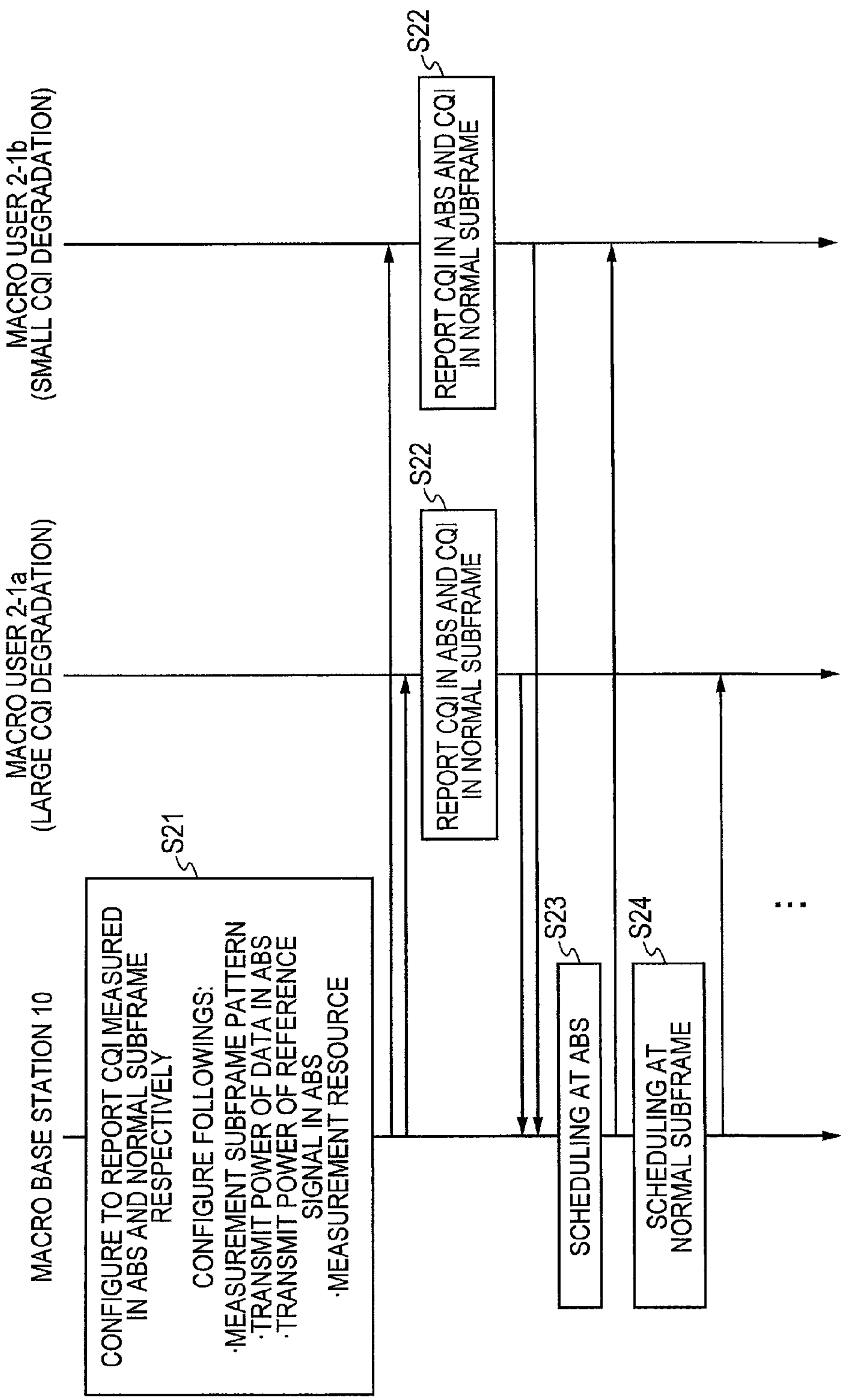
FIG. 8 is a diagram of an exemplary operation procedure in the case where the macro base station reduces transmission power in almost blank subframes according to the first embodiment.

FIG. 8 is an exemplary operation procedure in this case. The macro base station 10 configures the macro user 2-1 to report the CQI measured in the ABS and the normal subframe (S21). The macro user 2-1 then measures the ABS CQI and the normal subframe CQI and reports them to the macro base station (S22). In Step S22, two CQIs are simultaneously reported. However, the CQIs may be reported in such a way that the timing to report the CQIs and resources for use are separately reported, for example.

Generally, since the CQI is measured based on the reference signal, information to be informed from the macro base station 10 to the macro user 2-1 in Step S21 is different depending whether to reduce transmission power for the reference signal in the ABS. For example, in the case where transmission power for the data signal is reduced as well as transmission power for the reference signal is also reduced simultaneously in the ABS, similarly to Step S4 in FIG. 6, two types of subframe patterns for CQI measurement may be informed. Alternatively, in addition to this, transmission power for the reference signal and transmission power for the data signal in the ABS may be informed. However, since transmission power for the reference signal in the normal subframe is separately informed, a difference between transmission power for the reference signal in the ABS and transmission power for the reference signal in the normal subframe may be informed. On the other hand, in the case where transmission power for the reference signal is not changed and only transmission power for the data signal is reduced in the ABS, transmission power for the data signal, or a difference between transmission power for the reference signal and transmission power for the data signal in the ABS may be informed.

In LTE, the difference (the ratio) between transmission power for the reference signal and transmission power for the data signal in the normal subframe is called Pa or Pb. Information similar to Pa or Pb can be used to inform transmission power for the data signal in the ABS. In this case, the macro user 2-1 corrects the CQI measured from the reference signal, and calculates and reports the CQI in the ABS based on information about the informed transmission power for the data signal. Moreover, a reference signal and a resource to measure the CQI in the ABS may be newly provided. In this case, information about the location of the pertinent resource, timing of transmission, and a reference signal sequence, for example, may be informed. For the reference signal for the method described above, a channel state information reference signal (CSI-RS) or the like in LTE can be used, for example.

Furthermore, in Steps S23 and S24 in FIG. 8, the macro base station 10 schedules the macro user 2-1 using the CQI in the normal subframe and the CQI in the ABS of the macro user 2-1. For a scheduling method at this time, PFS or the like can also be used. In this case, the macro base station 10 schedules the macro user 2-1*a* with a reduction in the ABS CQI smaller than in the normal subframe CQI in priority in the ABS (S23). The macro base station 10 then schedules the macro user 2-1*b* with a large degradation in the CQI in the ABS in priority in the normal subframe (S24).

Device Configuration

Figure 9:
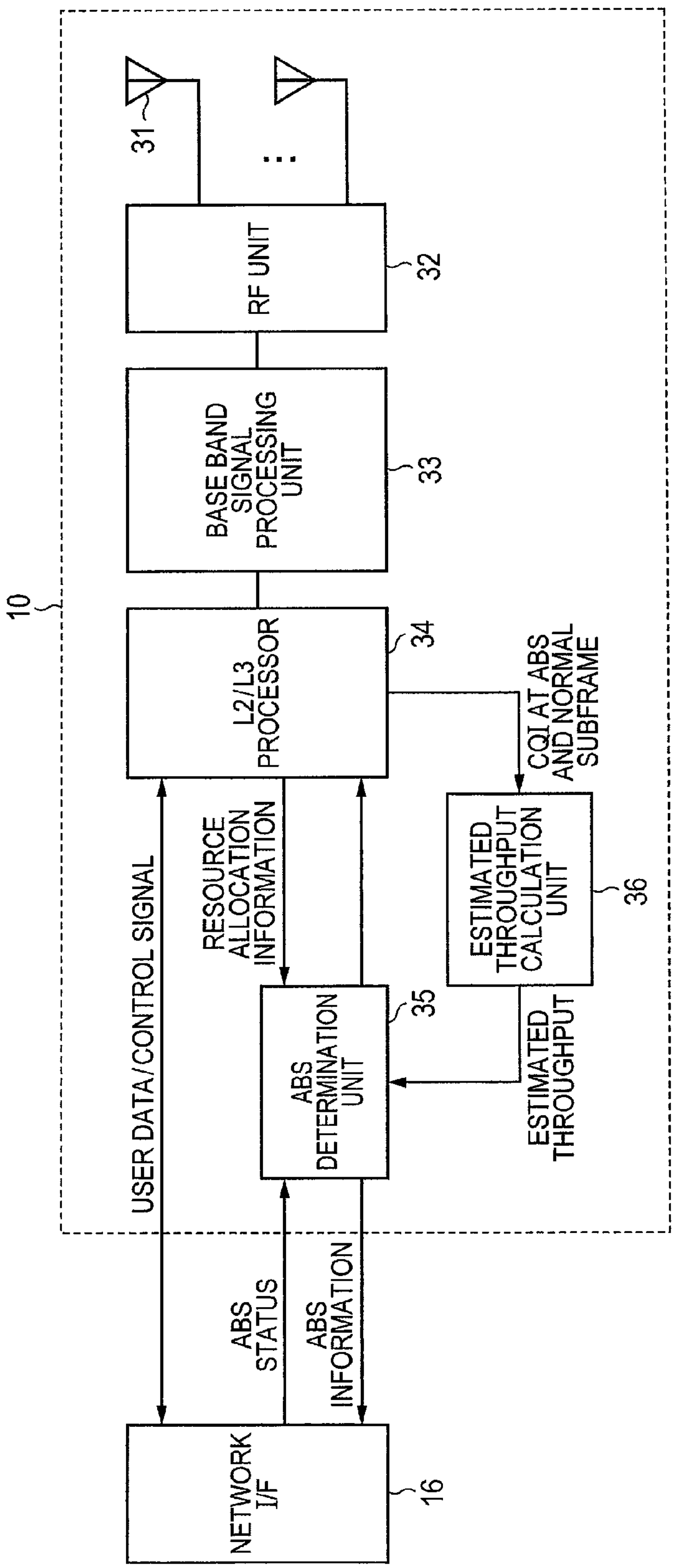
FIG. 9 is a diagram of an exemplary configuration of the macro base station according to the first embodiment.

FIG. 9 is a diagram of an exemplary configuration of the macro base station 10 according to the first embodiment. An antenna 31, an RF unit 32, and a baseband signal processing unit 33 may be the same as in the macro base station 1 of the existing system in FIG. 4. Points different from the configuration in FIG. 4 are in that an estimated throughput calculation unit 36 is additionally provided, an L2/L3 processor 34 configures the macro user 2-1 to report the CQI in the normal subframe and the CQI in the ABS as described in FIG. 8, and the CQIs are used for scheduling. Moreover, it is also different in that the CQI in the ABS and the CQI in the normal subframe of the macro user 2-1 are informed to the estimated throughput calculation unit 36. The CQI to inform may be an instantaneous value. For example, such a value may be possible in which a plurality of CQIs reported from the users in the interval of a period of 40 ms in the ABS pattern are averaged.

The newly provided estimated throughput calculation unit 36 can be implemented by program processing at the CPU that is the processing unit of the macro base station 10, not shown, similarly to the ABS determination unit 35. The estimated throughput calculation unit 36 is a unit that calculates the relationship between the ABS ratio and the throughput prediction value of the macro user 2-1 based on the CQI of the macro user 2-1 informed from the L2/L3 processor 34. The estimated throughput calculation unit 36 informs the calculated relationship between the ABS ratio and the throughput prediction value of the macro user 2-1 to the ABS determination unit 35 in a format as illustrated in FIG. 10, for example. Similarly to FIG. 7, FIG. 10 is configured of the IDs of the macro users 2-1 and the throughput prediction values for the ABS ratios. A calculation method for the throughput prediction value will be described later.

The ABS determination unit 35 determines the ABS ratio using the throughput prediction values of the LPN users 2-2 reported from the LPN 30 through the network I/F 16 (see FIG. 7) and the throughput prediction values of the macro users 2-1 informed from the estimated throughput calculation unit 36 (see FIG. 10). The ABS ratio may be determined using both of the throughput prediction value and the resource usage ratio used in the existing system. A specific determination method for the ABS ratio will be described later. In the case where the ABS ratio is determined, a method for deciding the ABS pattern (namely, which subframe is an ABS) may be a given method. For example, the ABS may appear at constant intervals as much as possible in 40 subframes.

Figure 11:
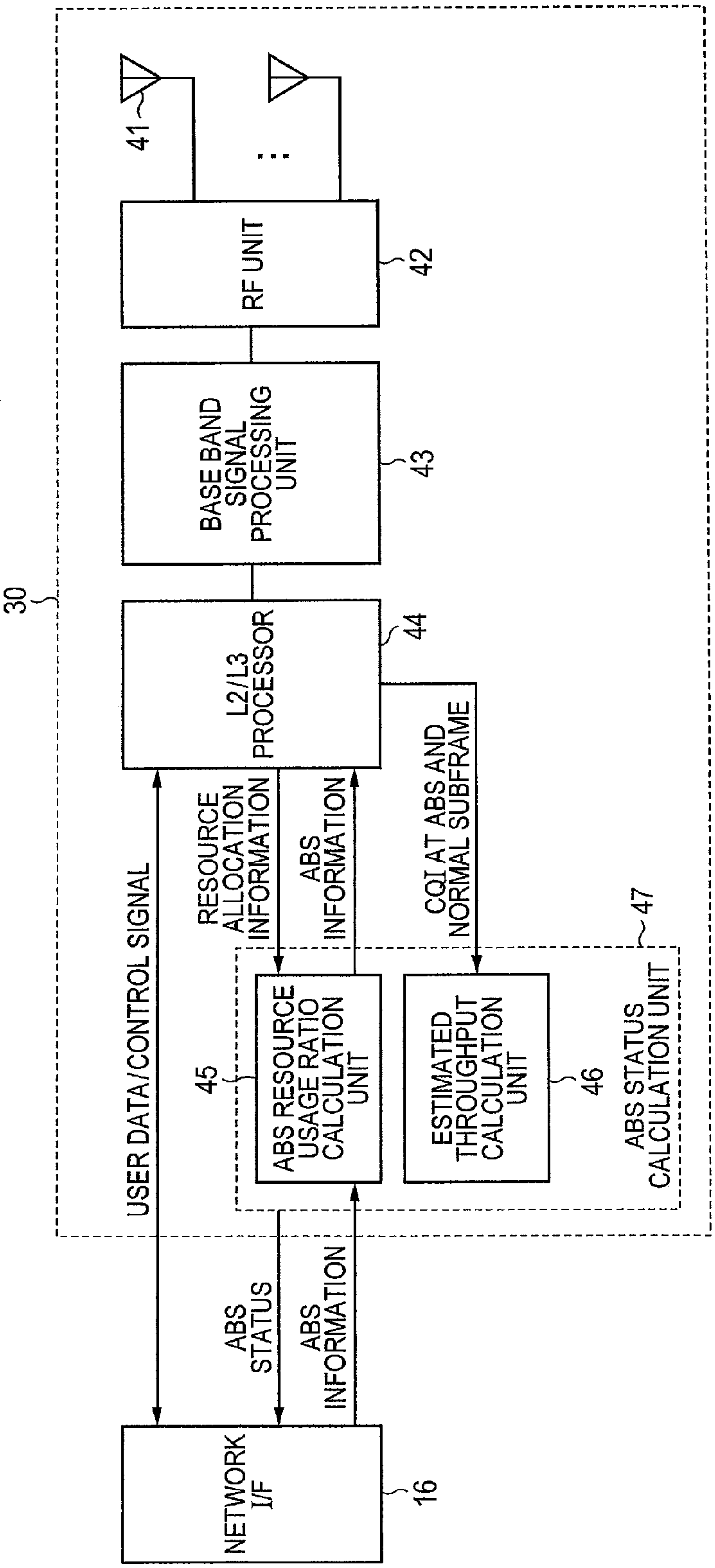
FIG. 11 is a diagram of an exemplary configuration of the LPN according to the first embodiment.

FIG. 11 is an exemplary configuration of the LPN 30 according to the first embodiment. An antenna 41, an RF unit 42, and a baseband signal processing unit 43 are configured similarly to those described in FIG. 5. As compared with the LPN 3 in FIG. 5, these points are different in that an estimated throughput calculation unit 46 is additionally provided and an L2/L3 processor 44 informs the CQI in the ABS and the CQI in the normal subframe of the LPN users 2-2 to the estimated throughput calculation unit 46. The CQI to inform may be an instantaneous value. For example, such a value may be possible in which a plurality of CQIs reported from the users in the interval of a period of 40 ms in the ABS pattern are averaged. The operation of the ABS resource usage ratio calculation unit 45 is the same as the operation in FIG. 5. However, in FIG. 11, the ABS resource usage ratio calculation unit 45 and the estimated throughput calculation unit 46 are combined together to form an ABS status calculation unit 47.

The estimated throughput calculation unit 46 according to the embodiment is a unit that calculates the relationship between the ABS ratio of the macro base station 10 and the throughput prediction values of the LPN users 2-2 based on the CQI in the ABS and the CQI in the normal subframe of the LPN users 2-2 informed from the L2/L3 processor 44. The calculation method for the throughput prediction value will be described later. The ABS resource usage ratio calculated at the ABS resource usage ratio calculation unit 45 and the throughput prediction values calculated at the estimated throughput calculation unit 46 are reported as the ABS status to the macro base station 10. However, both of the ABS resource usage ratio and the throughput prediction values may be reported, or any one of the ABS resource usage ratio and the throughput prediction values may be reported according to a request from the macro base station 10.

Calculation Method for the Throughput Prediction Value

The calculation method for the throughput prediction value of the macro user 2-1 or the LPN user 2-2 calculated at the estimated throughput calculation unit 36 of the macro base station 10 in FIG. 9 or the estimated throughput calculation unit 46 of the LPN 30 in FIG. 11 will be described. First, the calculation method for the throughput prediction value in the LPN 30 will be described. For example, suppose that PFS (Proportional Fairness Scheduling) is used in the LPN 30 and the total frequency resource (the total resource block) of a subframe is allocated to a single user. However, this is used as indexes to calculate the prediction values and to determine the ABS ratio by the macro base station 10. An actual scheduling method may not necessarily be PFS. Moreover, the number of units of the frequency resource to be allocated may be a given number.

In PFS, a division expression, instantaneous throughput/average throughput, is used as an evaluation function, and a resource is allocated to a user with the largest evaluation function. The instantaneous throughput is that the CQI reported from the user is converted into a data transmittable per subframe (or unit time). Alternatively, the instantaneous throughput may be spectrum efficiency. In order to maintain generality, in the following, it is considered that the instantaneous throughput means the same meaning as the CQI.

Suppose that the CQI in the ABS and the CQI in the normal subframe of the uth user are $C_{A,u}$ and $C_{N,u}$, respectively. At this time, evaluation functions $CostA_u$ and $CostN_u$ in the ABS and the normal subframe of the uth user can be expressed by Equations (1) and (2).

Equation 1

$$CostA_u = \frac{C_{A,u}}{\sum_k D_{k,u} / T_u} \quad (1)$$

Equation 2

$$CostN_u = \frac{C_{N,u}}{\sum_k D_{k,u} / T_u} \quad (2)$$

However, $D_{k,u}$ is a data transmitted to the uth user in the kth subframe, and $T_u$ is the communication time period (or the number of communication subframes) of the uth user. In PFS, a resource is allocated to a user that the evaluation functions of Equations (1) and (2) are the maximum in the ABS and in the normal subframe among the users connected to the base stations.

FIG. 12 is exemplary changes in the time period of users to which the evaluation functions and a resource are allocated. In FIG. 12, suppose that the LPN user 2-2*a* is a user subjected to a high interference from the macro base station 10 and the LPN user 2-2*b* is a user subjected to a low interference from the macro base station 10. Namely, the LPN user 2-2*a* is a user that the CQI is greatly improved in the ABS, and the LPN user 2-2*b* is a user that a difference of the CQI is small between the ABS and the normal subframe. This means $\Delta_a > \Delta_b$, where the ABS CQI normalized by the normal subframe CQI of the uth user is $\Delta_u = C_{A,u}/C_{N,u}$.

In FIG. 12, for example, $C_{A,a}=10$, $C_{N,a}=2$, $\Delta_a=5$, $C_{A,b}=7$, $C_{N,b}=5$, and $\Delta_b=1.4$. Moreover, in the case where a resource is allocated, suppose that a data the same as the CQI can be transmitted. (Namely, $D_{k,u}=C_{A,u}$ or $C_{N,u}$.) The ABS pattern of the macro base station 10 is that a subframe becomes an ABS per four subframes. From FIG. 12, when PFS is used, it is revealed that the evaluation function in the ABS becomes large in the user 2-2*a* with a large $\Delta_u$, whereas the evaluation function in the normal subframe becomes large in the user 2-2*b* with a small $\Delta_u$. As a result, an ABS resource is allocated in priority to the user 2-2*a*, and a normal subframe resource is allocated in priority to the user 2-2*b*. For example, in the case of two users, the tendency of resource allocation as described above can be separated into three cases depending which range the ABS ratio is in.

Figure 13A:
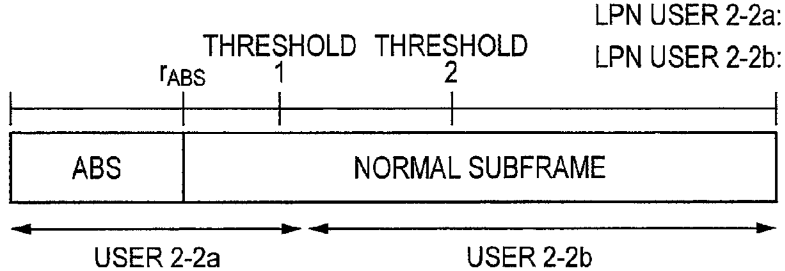
FIG. 13A is a diagram of exemplary resource allocation in applying almost blank subframes when an ABS ratio is changed according to the first embodiment.
Figure 13B:
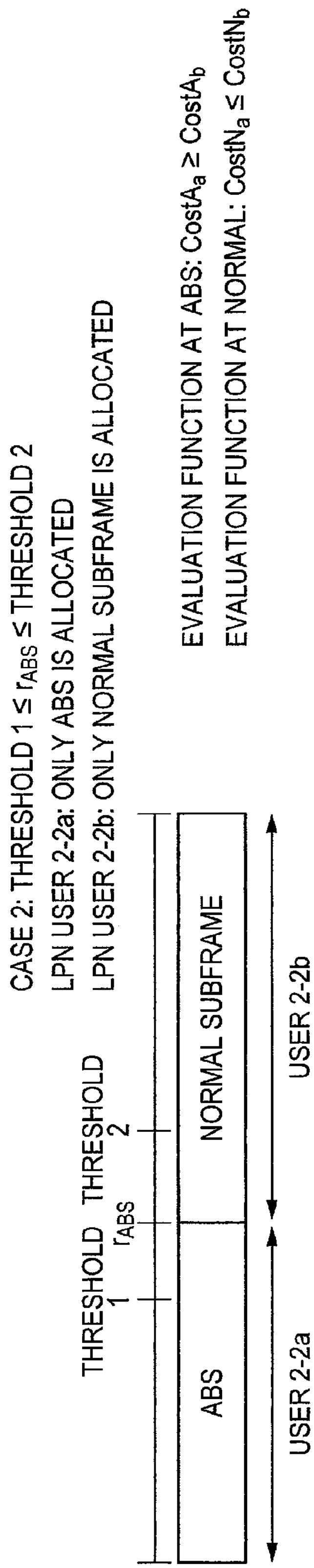
FIG. 13B is a diagram of another exemplary resource allocation in applying almost blank subframes when an ABS ratio is changed according to the first embodiment.
Figure 13C:
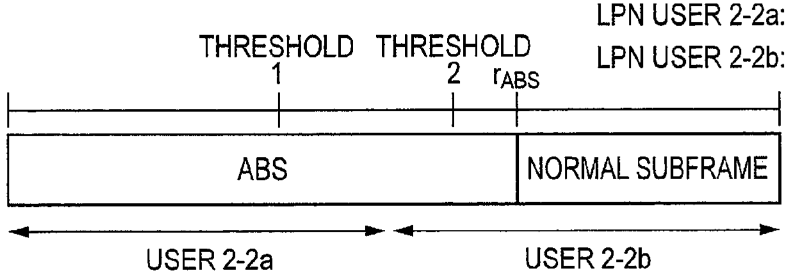
FIG. 13C is a diagram of still another exemplary resource allocation in applying almost blank subframes when an ABS ratio is changed according to the first embodiment.

FIGS. 13A, 13B, and 13C are the tendency of resource allocation of the user 2-2*a* and the user 2-2*b* in the ABS and the normal subframe and the relationship between the evaluation functions of the user 2-2*a* and the user 2-2*b* in three cases (Case 1, Case 2, and Case 3). Here, in the following, the ABS ratio to the total time period is expressed by $r_{ABS}$ ($0 \le r_{ABS} \le 1$). It is noted that $1-r_{ABS}$ is the ratio of the normal subframe. Moreover, the ABS ratio $r_{ABS}$ to be the boundary between Case 1 and Case 2 and the ABS ratio $r_{ABS}$ to be the boundary between Case 2 and Case 3 are a threshold 1 and a threshold 2, respectively.

Case 1 in FIG. 13A is the case where $0 \le r_{ABS} \le$ the threshold 1. In Case 1, both of the ABS and the normal subframe are allocated to the LPN user 2-2*a*, and only the normal subframe is allocated to the LPN user 2-2*b*. At this time, the evaluation function in the ABS is $CostA_a \ge CostA_b$, and the evaluation function in the normal subframe is $CostN_a = CostN_b$.

Case 2 in FIG. 13B is the case where the threshold 1 $\le r_{ABS} \le$ the threshold 2. In Case 2, only the ABS is allocated to the LPN user 2-2*a*, and only the normal subframe is allocated to the LPN user 2-2*b*. At this time, the evaluation function in the ABS is $CostA_a \ge CostA_b$, and the evaluation function in the normal subframe is $CostN_a \le CostN_b$. It is noted that in the example illustrated in FIG. 12, $r_{ABS}=0.25$, which corresponds to Case 2.

Case 3 in FIG. 13C is the case where the threshold 2 $\le r_{ABS} \le 1.0$. In Case 3, only the ABS is allocated to the LPN user 2-2*a*, and both of the ABS and the normal subframe are allocated to the LPN user 2-2*b*. At this time, the evaluation function in the ABS is $CostA_a = CostA_b$, and the evaluation function in the normal subframe is $CostN_a \le CostN_b$.

As described above, at the boundaries of Cases 1, 2, and 3, that is, at points at which the ABS ratio $r_{ABS}$ is equal to the threshold 1 and the threshold 2, resources to be allocated to the user 2-2*a* and the user 2-2*b* are changed. As a result, the relationship between changes in the throughput of the user 2-2*a* and the throughput of the user 2-2*b* to a change in the ABS ratio $r_{ABS}$ (a slope of a graph is changed in the case where the horizontal axis expresses the ABS ratio $r_{ABS}$ and the vertical axis expresses the throughput) is changed. In Cases 1, 2, and 3, a slope of the throughput to a change in the ABS ratio $r_{ABS}$ is constant. Therefore, the throughput of the user 2-2*a* and the throughput of the user 2-2*b* are calculated when the ABS ratio $r_{ABS}$ takes zero, the threshold 1, the threshold 2, and 1.0, and the values between zero, the threshold 1, the threshold 2, and 1.0 are linearly interpolated, so that the throughput prediction values of the user 2-2*a* and the user 2-2*b* can be calculated at given values of the ABS ratio $r_{ABS}$.

Next, a calculation method for the thresholds 1 and 2 will be described. The threshold 1 is the boundary between Case 1 and Case 2. Therefore, in the case where $r_{ABS}$ = the threshold 1, only the ABS is allocated to the user 2-2*a*, only the normal subframe is allocated to the user 2-2*b*, and the evaluation functions of the users 2-2*a* and 2-2*b* are made equal in the normal subframe. At this time, the relationship between the evaluation functions in the normal subframe satisfies Equation (3).

Equation 3

$$CostN_a = CostN_b$$
$$\frac{C_{N,a}}{\Delta_a C_{N,a} r_{ABS}} = \frac{C_{N,b}}{C_{N,b}(1 - r_{ABS})} \quad (3)$$

From Equation (3), $r_{ABS} = r_{ABS}$ (Th1) to be the threshold 1 can be found as Equation (4).

Equation 4

$$r_{ABS}(Th1) = \frac{1}{\Delta_a + 1} \quad (4)$$

Here, suppose that the throughput prediction value of the uth user when the ABS ratio is the ABS ratio $r_{ABS}$ is expressed by $E_u$ ($r_{ABS}$). At this time, since the throughput prediction values, $E_a$ ($r_{ABS}$ (Th1)) and $E_b$ ($r_{ABS}$ (Th1)), of the user 2-2*a* and the user 2-2*b* at the threshold 1 can be expressed by the denominators on the left-hand side and the right-hand side of Equation (3), the vales are expressed by Equations (5) and (6).

Equation 5

$$E_a(r_{ABS}(Th1)) = \frac{\Delta_a C_{N,a}}{\Delta_a + 1} \quad (5)$$

Equation 6

$$E_b(r_{ABS}(Th1)) = \frac{\Delta_a C_{N,b}}{\Delta_a + 1} \quad (6)$$

Similarly, the threshold 2 is the boundary between Case 2 and Case 3. Therefore, in the case where the ABS ratio $r_{ABS}$ takes the threshold 2, only the ABS is allocated to the user 2-2*a*, only the normal subframe is allocated to the user 2-2*b*, and the evaluation functions of the user 2-2*a* and the user 2-2*b* are made equal in the ABS. At this time, the relationship between the evaluation functions in the ABS satisfies Equation (7).

Equation 7

$$CostA_a = CostA_b \quad (7)$$
$$\frac{\Delta_a C_{N,a}}{\Delta_a C_{N,a} r_{ABS}} = \frac{\Delta_b C_{N,b}}{C_{N,b}(1 - r_{ABS})}$$

From Equation (7), the ABS ratio $r_{ABS}$ (Th2) to be the threshold 2 is expressed by Equation (8).

Equation 8

$$r_{ABS}(Th2) = \frac{1}{\Delta_b + 1} \quad (8)$$

At this time, since the throughput prediction values, $E_a$ ($r_{ABS}$(Th2)) and $E_b$ ($r_{ABS}$(Th2)), of the user 2-2*a* and the user 2-2*b* can be expressed by the denominators on the left-hand side and the right-hand side of Equation (7), the values are expressed by Equations (9) and (10).

Equation 9

$$E_a(r_{ABS}(Th2)) = \frac{\Delta_a C_{N,a}}{\Delta_b + 1} \quad (9)$$

Equation 10

$$E_b(r_{ABS}(Th2)) = \frac{\Delta_b C_{N,b}}{\Delta_b + 1} \quad (10)$$

Moreover, in the case where $r_{ABS}$=0 and $r_{ABS}$=1.0, that is, in the case of only the normal subframe and only the ABS, time resources in the normal subframe and the ABS are equally divided between the user 2-2*a* and the user 2-2*b*. Therefore, the throughput prediction values at this time, $E_a$ (0), $E_b$ (0), $E_a$ (1.0), and $E_b$, can be expressed by Equations (11) to (14).

Equation 11

$$E_a(0) = \frac{C_{N,a}}{2} \quad (11)$$

-continued

Equation 12

$$E_b(0) = \frac{C_{N,b}}{2} \quad (12)$$

Equation 13

$$E_a(1.0) = \frac{\Delta_a C_{N,a}}{2} \quad (13)$$

Equation 14

$$E_b(1.0) = \frac{\Delta_b C_{N,b}}{2} \quad (14)$$

The similar calculation method can be expanded in the case where a given number of users are taken. Here, suppose that the number of the LPN users 2-2 per LPN 30 is $U_L$ and the IDs of the LPN users 2-2 are set as 1, 2, to $U_L$, $\Delta_1 > \Delta_2 >$to $> \Delta_{UL}$. In the case where the number of users is $U_L$, $2(U_L-1)$ thresholds occur in total.

At a threshold 2u−1 (u=1 to $U_L$−1), only the ABS is allocated to the LPN users 1 to u, only the normal subframe is allocated to the LPN users u+1 to $U_L$, and the evaluation functions in the normal subframe are made equal between the LPN users u to $U_L$. However, the LPN users 1 to u equally divide the ABS resource, and the LPN users u+1 to $U_L$ equally divide the normal subframe resource. At this time, the evaluation function in the normal subframe satisfies Equation (15).

Equation 15

$$CostN_u = CostN_{u+1} = \ldots = CostN_{U_L} \quad (15)$$
$$\frac{C_{N,u}}{\Delta_u C_{N,u} r_{ABS} / u} = \frac{C_{N,u+1}}{C_{N,u+1}(1 - r_{ABS})/(U_L - u)} = \ldots = \frac{C_{N,U_L}}{C_{N,U_L}(1 - r_{ABS})/(U_L - u)}$$

Therefore, the ABS ratio $r_{ABS}$ (Th(2u−1)) to be the threshold 2u−1 can be expressed by Equation (16), the throughput prediction values of the LPN users i=1 to u at this time can be expressed by Equation (17), and the throughput prediction values of the LPN users j=u+1 to UL can be expressed by Equation (18).

Equation 16

$$r_{ABS}(Th(2u-1)) = \frac{u}{\Delta_u(U_L - u) + u} \quad (16)$$

Equation 17

$$E_i(Th(2u-1)) = \frac{\Delta_i C_{N,i}}{\Delta_u(U_L - u) + u} \quad i = 1, 2, \ldots, u \quad (17)$$

Equation 18

$$E_j(Th(2u-1)) = \frac{\Delta_u C_{N,j}}{\Delta_u(U_L - u) + u} \quad j = u+1, u+2, \ldots, U_L \quad (18)$$

Moreover, at a threshold 2u (u=1 to $U_L$−1), only the ABS is allocated to the LPN users 1 to u, only the normal subframe is allocated to the LPN users u+1 to $U_L$, and the evaluation functions in the ABS are made equal between the LPN users 1 to u+1. However, the LPN users 1 to u equally divide the ABS resource, and the LPN users u+1 to $U_L$ equally divide the normal subframe resource. At this time, the evaluation function in the ABS satisfies Equation (19).

Equation 19

$$\frac{\Delta_1 C_{N,1}}{\Delta_1 C_{N,1} r_{ABS}/u} = \begin{matrix} CostA_1 = \ldots = CostA_u = CostA_{u+1} \\ \ldots = \frac{\Delta_u C_{N,u}}{\Delta_u C_{N,u} r_{ABS}/u} = \frac{\Delta_{u+1} C_{N,u+1}}{C_{N,u+1}(1-r_{ABS})/(U_L-u)} \end{matrix} \quad (19)$$

Therefore, the ABS ratio $r_{ABS}$ (Th(2u)) to be the threshold 2$u$ can be expressed by Equation (20), the throughput prediction values of the LPN users i=1 to u at this time can be expressed by Equation (21), and the throughput prediction values of the LPN users j=u+1 to $U_L$ can be expressed by Equation (22).

Equation 20

$$r_{ABS}(Th(2u)) = \frac{u}{\Delta_{u+1}(U_L-u)+u} \quad (20)$$

Equation 21

$$E_i(Th(2u)) = \frac{\Delta_i C_{N,i}}{\Delta_{u+1}(U_L-u)+u} \quad i = 1, 2, \ldots, u \quad (21)$$

Equation 22

$$E_j(Th(2u)) = \frac{\Delta_{u+1} C_{N,j}}{\Delta_{u+1}(U_L-u)+u} \quad j = u+1, u+2, \ldots, U_L \quad (22)$$

Furthermore, suppose that $r_{ABS}$=0 and $r_{ABS}$=1.0 are a threshold 0 and a threshold $2U_L-1$, respectively (namely, $r_{ABS}$ (Th0)=0 and $r_{ABS}$ (Th($2U_L-1$))=1.0), the throughput prediction value of the LPN user i (i=1 to $U_L$) can be expressed by Equations (23) and (24).

Equation 23

$$E_i(Th0) = \frac{C_{N,i}}{U_L} \quad i = 1, 2, \ldots, U_L \quad (23)$$

Equation 24

$$E_i(Th(2U_L-1)) = \frac{\Delta_i C_{N,i}}{U_L} \quad i = 1, 2, \ldots, U_L \quad (24)$$

Here, it is shown that Equation (23) is equal to the case where u=0 in Equations (20) to (22), and Equation (24) is equal to the case where u=$U_L$ in Equations (16) to (18). Therefore, in the case where the number of users of the LPN 30 is $U_L$, it can be said that $2U_L$ thresholds occur in total also including the case where $r_{ABS}$=0 and $r_{ABS}$=1.0. Furthermore, from Equations (16), (17), (19), (20), (21), (22), (23), and (24), the ABS ratio $r_{ABS}$ (Th(n)) to be the nth threshold (n=0 to $2U_L-1$) and the throughput prediction value of the LPN user u at this time can be generalized as in Equations (25) and (26).

Equation 25

$$r_{ABS}(Th(n)) = \frac{\lceil n/2 \rceil}{\Delta_{\lfloor n/2 \rfloor+1}(U_L - \lceil n/2 \rceil) + \lceil n/2 \rceil} \quad (25)$$
$$n = 0, 1, \ldots, 2U_L - 1$$

-continued

Equation 26

$$E_u(r_{ABS}(Th(n))) = \begin{cases} \frac{\Delta_u C_{N,u}}{\Delta_{\lfloor n/2 \rfloor+1}(U_L - \lceil n/2 \rceil) + \lceil n/2 \rceil} & u = 1, 2, \ldots, \lceil n/2 \rceil \\ \frac{\Delta_{\lfloor n/2 \rfloor+1} C_{N,u}}{\Delta_{\lfloor n/2 \rfloor+1}(U_L - \lceil n/2 \rceil) + \lceil n/2 \rceil} & u = \lceil n/2 \rceil + 1, \ldots, U_L \end{cases} \quad (26)$$
$$n = 0, 1, \ldots, 2U_L - 1$$

Equations (25) and (26) are used to linear interpolation the throughput prediction values at the calculated thresholds, so that the LPN 30 can calculate the relationship between a given ABS ratio $r_{ABS}$ and the throughput prediction values of the LPN users.

Figure 14A:
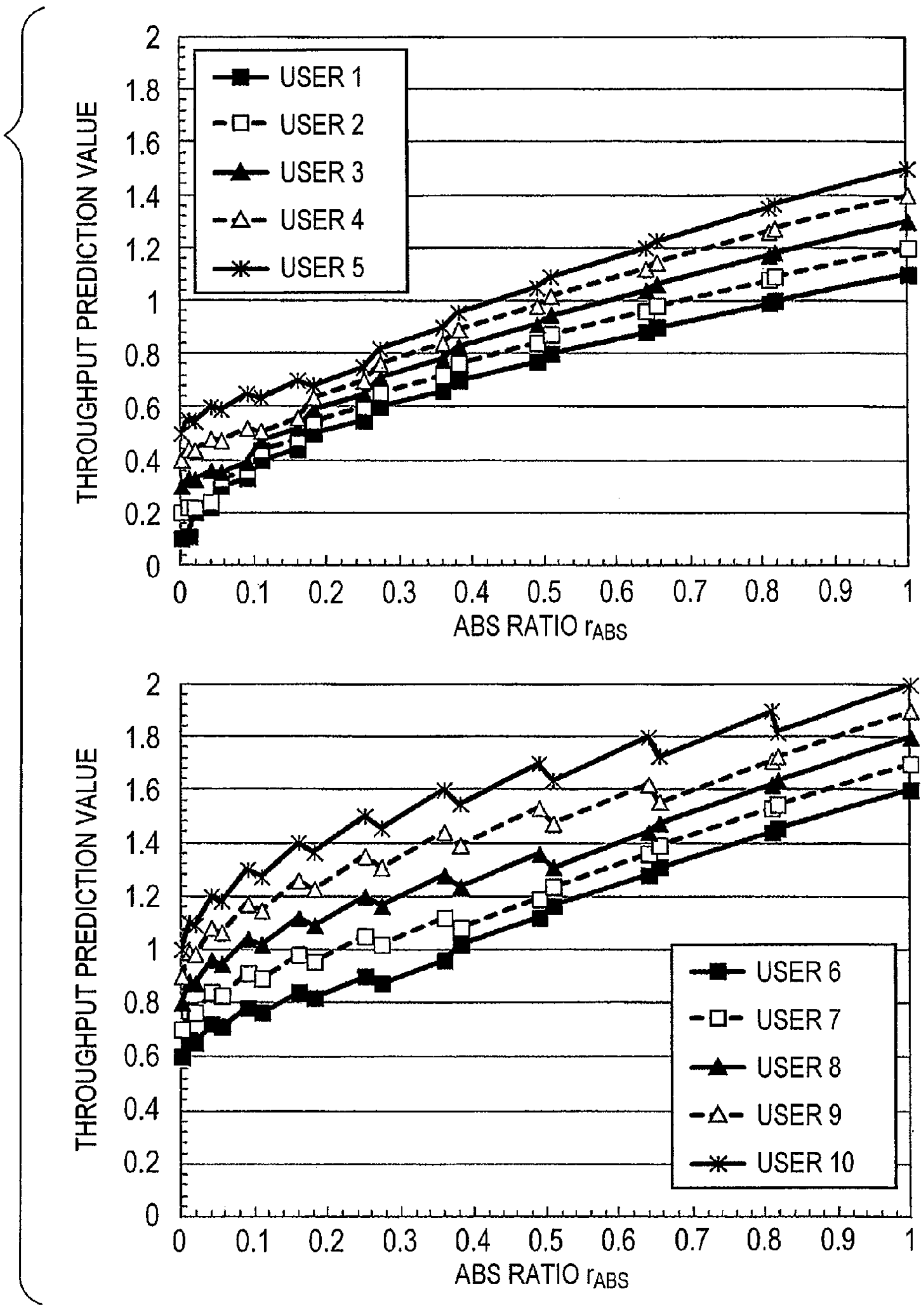
FIG. 14A is graphs of an exemplary relationship between the ABS ratios and the throughput prediction values of LPN users according to the first embodiment.
Figure 15A:
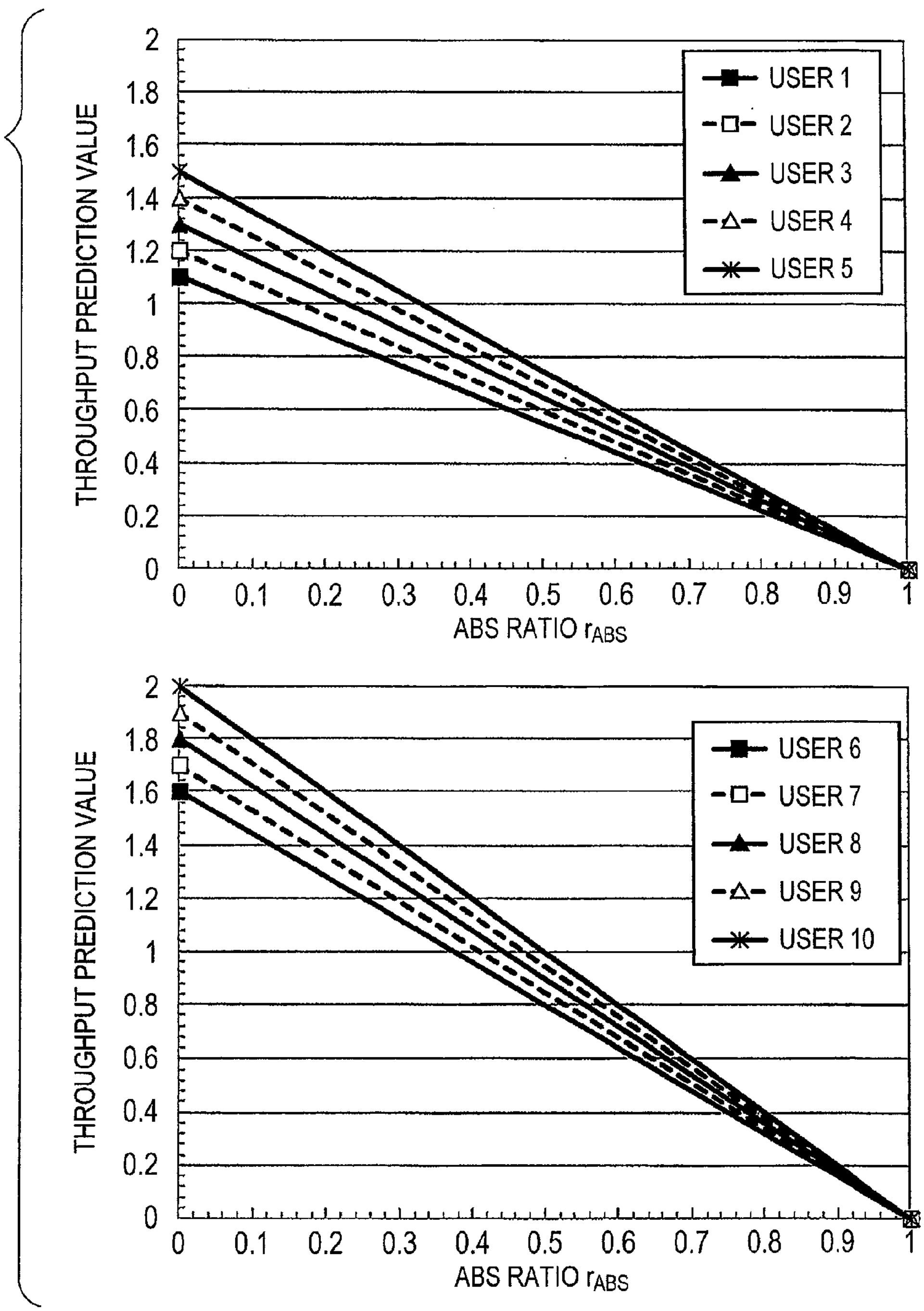
FIG. 15A is graphs of an exemplary relationship between ABS ratios and throughput prediction values of macro users in the case where the macro base station reduces transmission power to zero in almost blank subframes according to the first embodiment.

The upper part and the lower part in FIG. 14A are exemplary throughput prediction values to the ABS ratios $r_{ABS}$ found using Equations (25) and (26). The number of LPN users is ten, and the ABS CQI and the normal subframe CQI are listed in Table 50 in FIG. 14B. Plot points in FIG. 14A express the throughput prediction values of the LPN users at the thresholds, and the values between the plot points are linearly interpolated. The upper part in FIG. 14A expresses the throughput prediction value of a user ID 1-5, and the lower part in FIG. 14A expresses the throughput prediction value of a user ID 6-10. It is noted that the upper part and the lower part in FIGS. 15A and 16A similarly express the throughput prediction values. The LPN 3 calculates the throughput prediction values of the LPN users 2-2 using Equations (25) and (26), and reports the values to the macro base station 10 in a format illustrated in FIG. 7.

Equations (25) and (26) can also be used in the case where the estimated throughput calculation unit 36 of the macro base station 10 calculates the throughput prediction value of the macro user 2-1. Here, since the ABS CQI is smaller than the normal subframe CQI in the macro base station 10, basically $\Delta_u = C_{A,u}/C_{N,u}$ is held. However, in the case where the macro base station 10 reduces transmission power in the ABS to zero (namely, the macro base station 10 stops transmission), $\Delta_u$=0 is held, and zero is used for division in Equations (25) and (26). Therefore, in this case, a tiny number close to zero may be used. In the case where the macro base station 10 reduces transmission power in the ABS, the CQI in the ABS of the macro user 2-1 acquired according to the method in FIG. 8, for example, may be used.

Figure 16A:
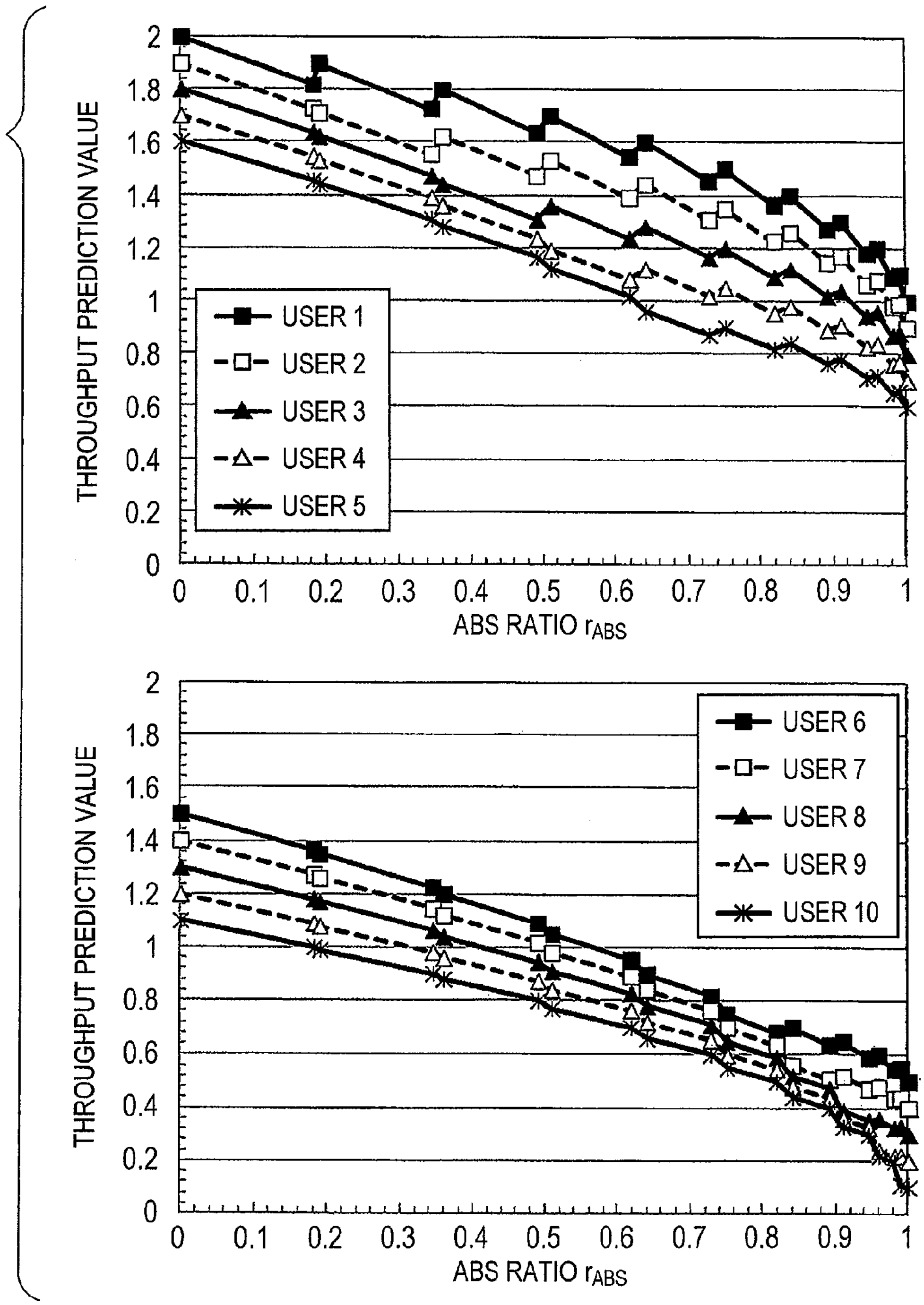
FIG. 16A graphs of an exemplary relationship between ABS ratios and throughput prediction values of macro users in the case where the macro base station reduces transmission power in almost blank subframes according to the first embodiment.

FIGS. 15A and 15B, and FIGS. 16A and 16B are graphs and tables of exemplary prediction values of the macro user 2-1 in the case where the macro base station 1 reduces transmission power in the ABS to zero and in the case where the macro base station 10 reduces transmission power, respectively. The number of the macro users 2-1 is ten, and values in Table 51 in FIG. 15B and Table 52 in FIG. 16B are used for the CQI. It is noted that the ABS CQI in the case where transmission power is reduced to zero is $10^{-10}$.

Setting Method for the ABS of the Macro Base Station

An exemplary method for determining the ABS at the ABS determination unit 35 of the macro base station 1 according to the embodiment in FIG. 9 will be described. As described above, the ABS determination unit 35 holds the throughput prediction values of the LPN users 2-2 reported from the LPN 3 (see FIG. 7) and the throughput prediction values of the macro users 2-1 acquired from the estimated throughput calculation unit 36 of the macro base station 10 (see FIG. 10). Therefore, the ABS determination unit 35 can determine the ABS ratio using given criteria.

Figure 17:
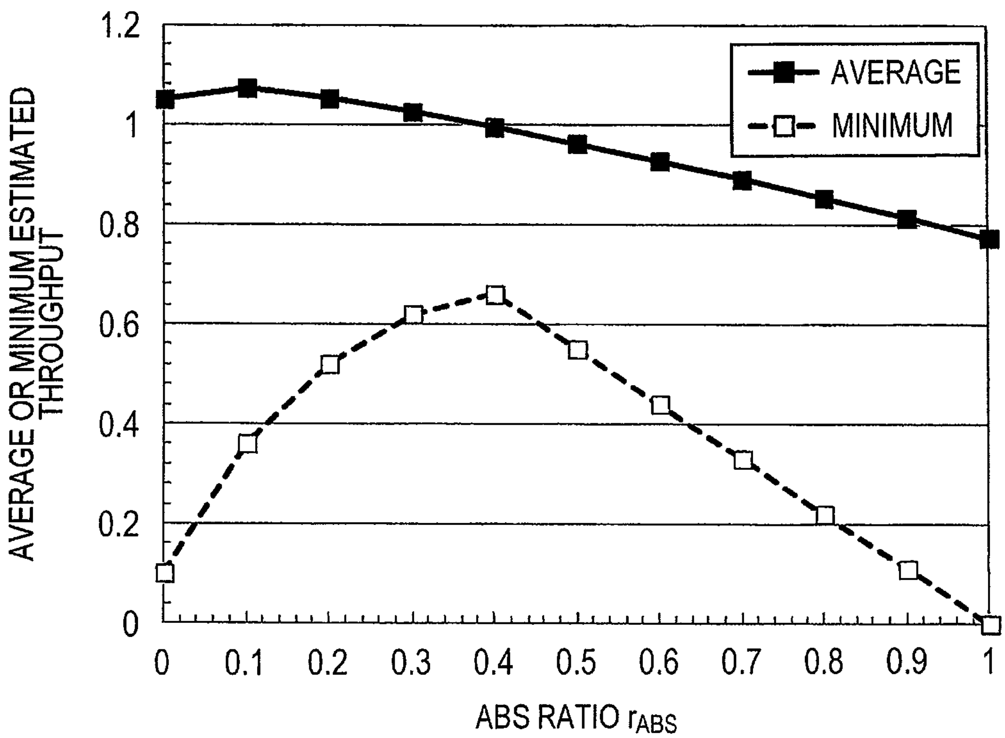
FIG. 17 is a diagram of examples of ABS ratios and prediction values of average or minimum throughput of all the users according to the first embodiment.

For example, FIG. 17 is exemplary average throughput prediction values and exemplary minimum throughput prediction values of all the users including the macro user 2-1 and the LPN user 2-2 to the ABS ratio $r_{ABS}$. FIG. 17 is calculated from FIGS. 14A and 15A. In FIG. 17, the ABS determination unit 35 determines the ABS ratio at 0.1 in the case of maximizing the average throughput, and determines the ABS ratio at 0.4 in the case of maximizing the minimum throughput. In addition to this, such a configuration may be possible in which the ABS determination unit 35 determines the ABS ratio that maximizes the throughput at which the cumulative distribution of the throughput prediction values is X %, or the ABS determination unit 35 determines the minimum ABS ratio at which X % of the maximum average throughput can be achieved.

Moreover, in addition to the throughput prediction values, the resource usage ratio used in the existing system may be used simultaneously. For example, in the case where the resource usage ratio of the macro base station 10 or the LPN 30 is 100%, it is effective to apply the method of using the throughput prediction values, for example. This is because the present ABS pattern causes no problem in the case where the resource usage ratios of all the base stations are less than 100%, so that it is unnecessary to modify the ABS pattern using the throughput prediction values.

Second Embodiment

Figure 18:
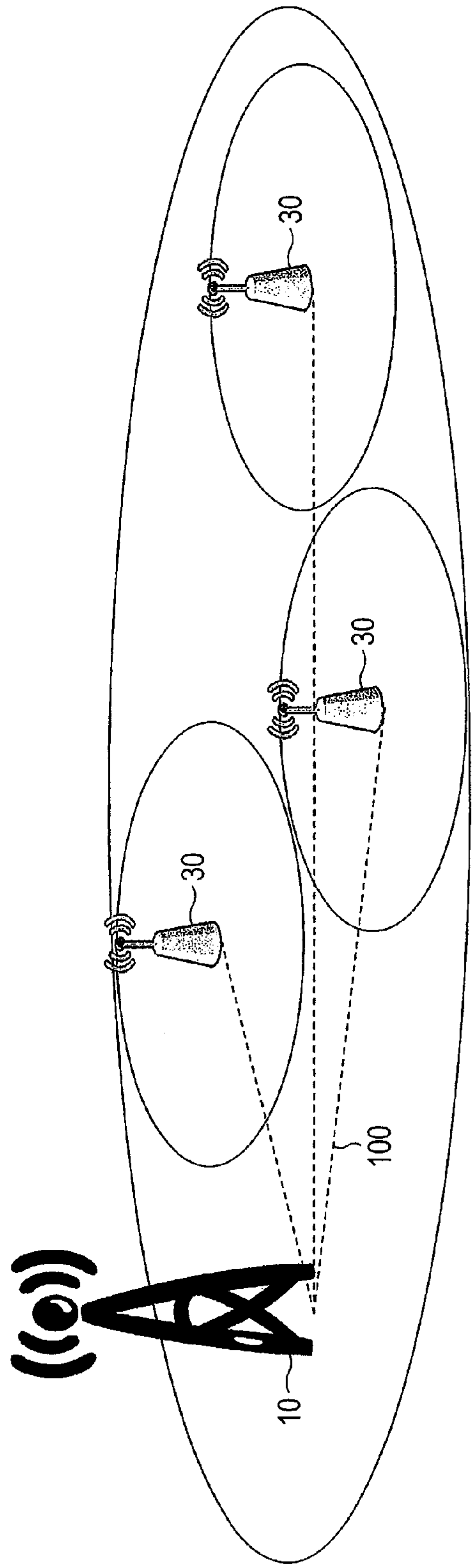
FIG. 18 is a diagram of an exemplary system configuration of a centralized base station according to a second embodiment.

In a second embodiment, the macro base station 1 also calculates the throughput prediction values of the LPN users 2-2. For example, the second embodiment is effective in the case of a centralized base station configuration as in FIG. 18, in which an LPN 30 and a macro base station 10 are connected to each other through cables such as an optical fiber. In this case, the LPN 30 is in a RRH configuration only including the antenna 41 and the RF unit 42 in FIG. 11 and a photoelectric converter. The components after the baseband signal processing unit 43 may be put together at the same location as the macro base station 10.

Figure 19:
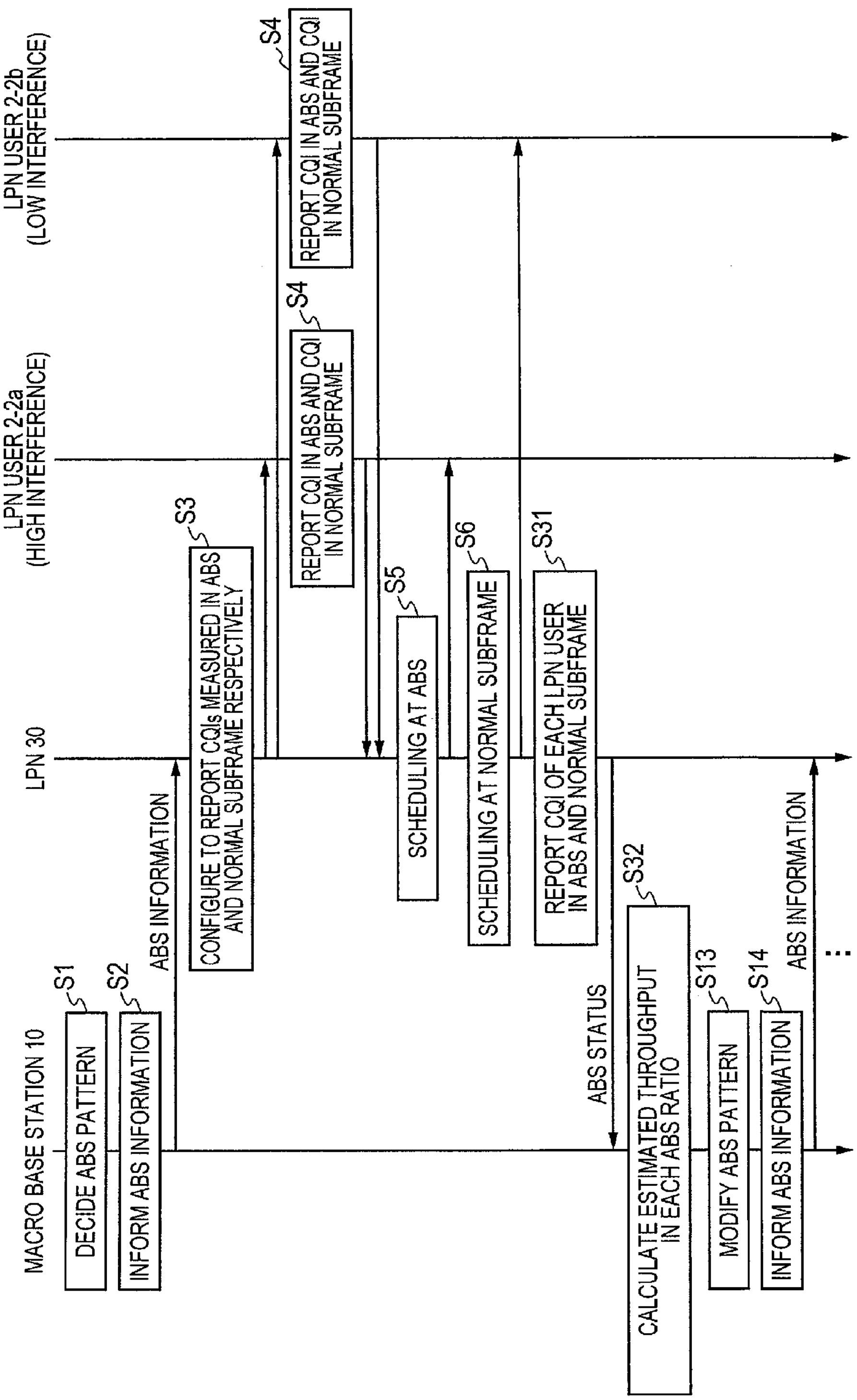
FIG. 19 is a diagram of an exemplary operation procedure of a system according to the second embodiment.

FIG. 19 is an exemplary operation procedure according to the second embodiment. The operations in Steps S1 to S6 in FIG. 19 may be the same as in FIG. 6. In Step S31, the LPN 30 reports the ABS CQI and the normal subframe CQI of LPN users 2-2 acquired in Step S4 to the macro base station 10. FIG. 20 is examples of the ABS CQI and the normal subframe CQI of the users reported from the LPN 3 to the macro base station 10. The CQIs to report are in units of bps/Hz. However, the CQIs may be indexes quantized into a few bits of information according to certain rules, or may include RI or the like as described above.

The macro base station 10 uses the CQI of the LPN user 2-2 informed from the LPN 30 to calculate the throughput prediction value of the LPN user 2-2 (S32). Moreover, the macro base station 10 also calculates the throughput prediction value of the macro user 2-1. The macro base station 10 then determines the ABS ratio and the ABS pattern using these items of information (S13), and informs the ABS information to the LPN 30 as necessary (S14). The calculation method for the throughput prediction value is as described in Equations (25) and (26). Furthermore, the determination method for the ABS is also as described above.

Third Embodiment

Figure 21:
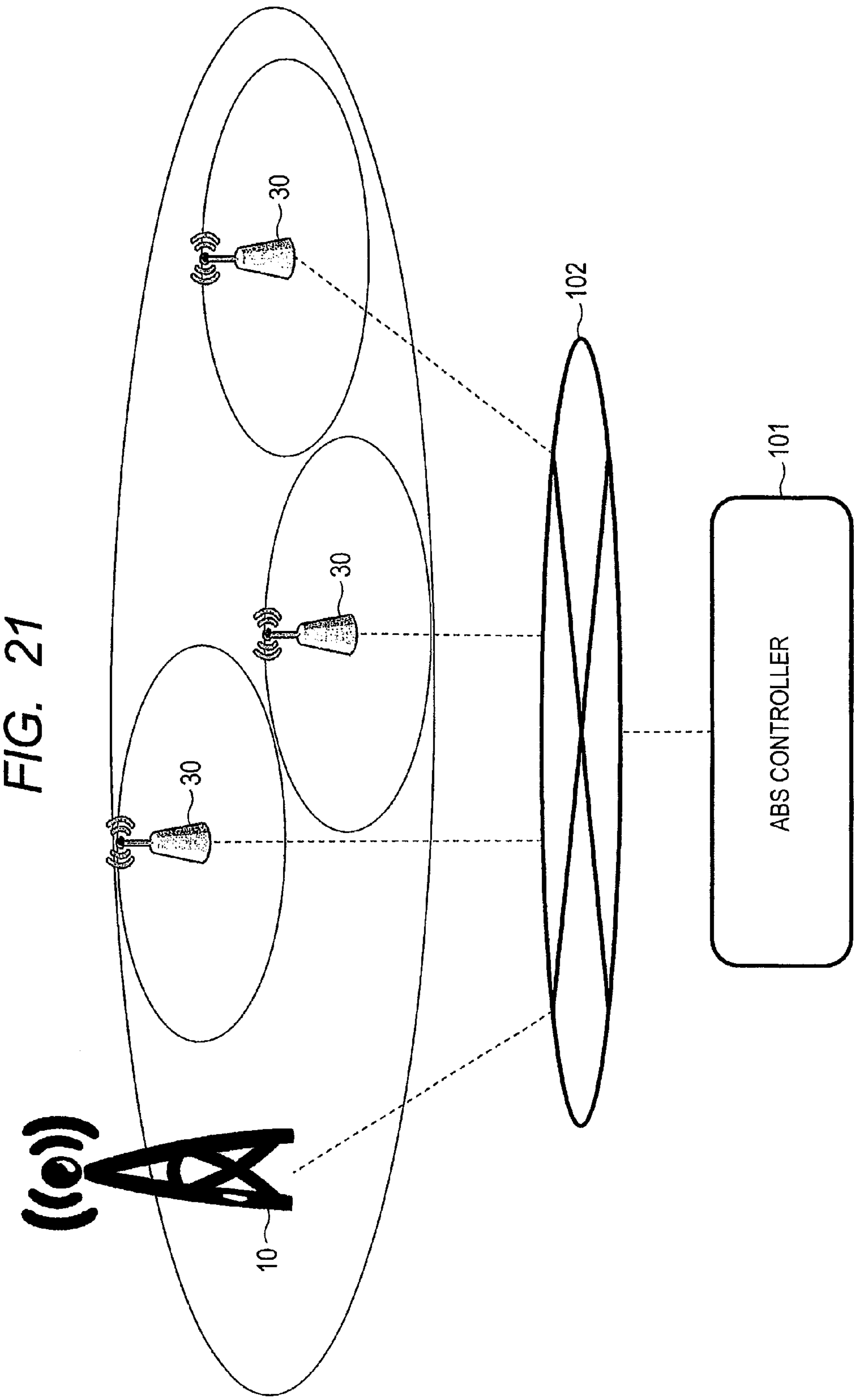
FIG. 21 is a diagram of an exemplary system configuration according to a third embodiment.

In a third embodiment, an ABS controller 101 different from a macro base station 10 and an LPN 30 determines the ABS ratio and the ABS pattern. FIG. 21 is an exemplary system configuration according to the third embodiment. The macro base station 10 and the LPN 30 are connected to the ABS controller 101 through a network I/F 102, or directly connected thereto. A plurality of the macro base stations 10 and a plurality of the LPNs 30 may be connected to the ABS controller 101.

Figure 22:
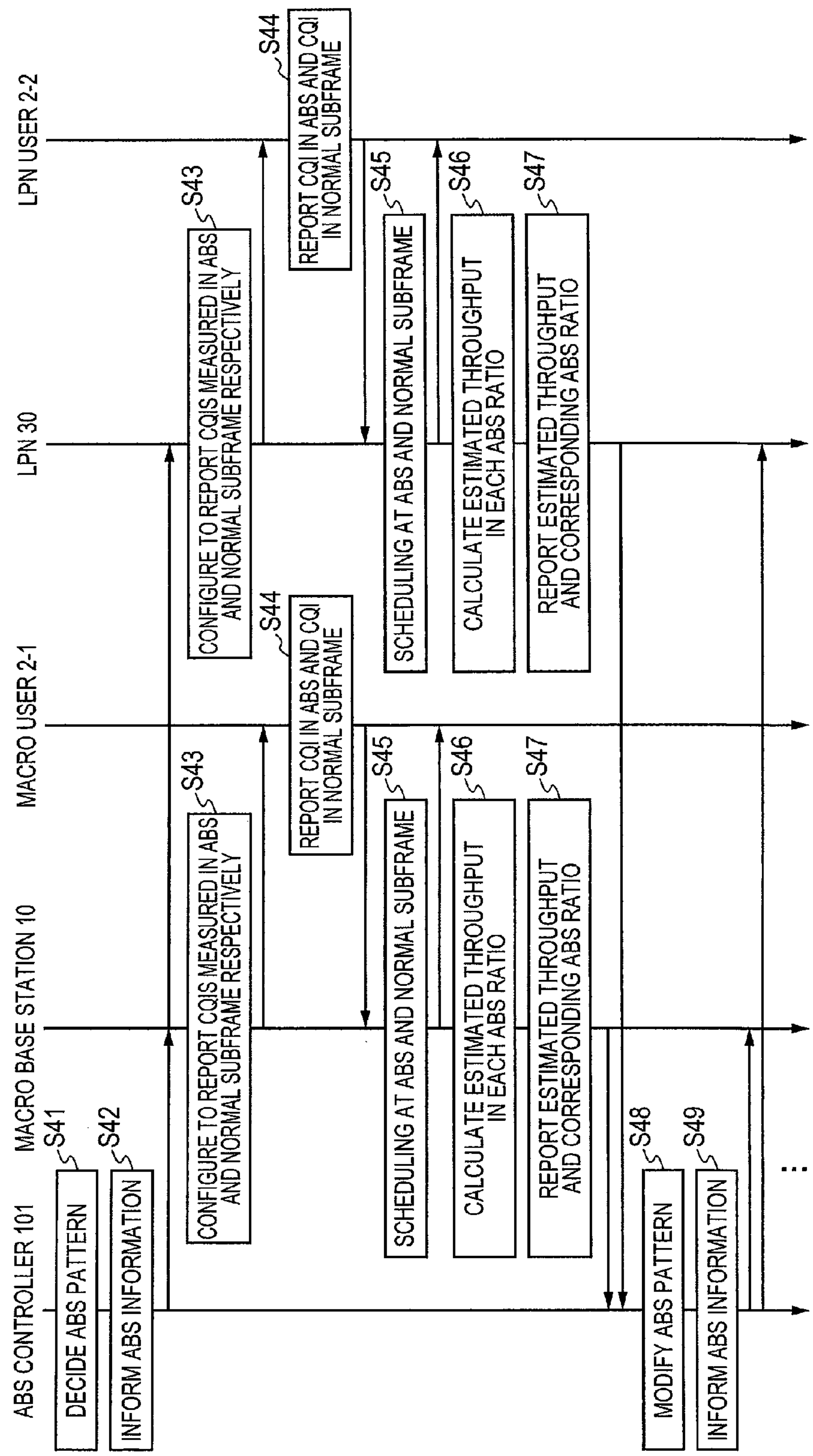
FIG. 22 is a diagram of an exemplary operation procedure of a system according to the third embodiment.

FIG. 22 is an exemplary operation procedure in the case where the ABS controller 101 exists. First, the ABS controller 101 decides the ABS pattern (S41), and informs the ABS pattern to the macro base station 10 and the LPN 30 (S42). The macro base station 10 and the LPN 30 receive information about the ABS pattern, and configure the macro user 2-1 and the LPN user 2-2 to report the CQI measured in the ABS and the normal subframe (S43). In the case where the macro base station 10 stops transmission, or in the case where the CQI in the ABS is corrected and calculated on the macro base station 10 side, the macro base station 10 may not perform the operation in Step S43. The macro user 2-1 and the LPN user 2-2 that configured to report the two types of the CQIs from the macro base station 10 and the LPN 30 measure the CQI in the ABS and the CQI in the normal subframe according to the methods described above, and report the CQIs to the macro base station 10 and the LPN 30 to which the macro user 2-1 and the LPN user 2-2 are connected (S44). The macro base station 10 and the LPN 30 perform scheduling using the CQIs reported in Step S44 (S45). Moreover, the macro base station 10 and the LPN 30 calculate the relationship between the ABS ratios and the throughput prediction values of the users using the reported CQIs and Equations (25) and (26) (S46). The macro base station 10 and the LPN 30 then report the throughput prediction values calculated in Step S46 to the ABS controller 101 (S47). Reports may be provided periodically, or may be provided in the case where a configuration is received from the ABS controller. The ABS controller 101 determines the ABS ratio and the ABS pattern using the throughput prediction values of the macro user 2-1 and the LPN user 2-2 reported in Step S47. The ABS controller 101 modifies the ABS pattern when a change is necessary, and informs the ABS pattern to the macro base station 10 and the LPN 30 (S48 and S49).

It is noted that in FIG. 22, the macro base station 10 and the LPN 30 calculate the throughput prediction values. However, similarly to FIG. 19, such a configuration may be possible in which the macro base station 10 and the LPN 30 report the ABS CQI and the normal subframe CQI of the macro user 2-1 and the LPN user 2-2 to the ABS controller 101 and the ABS controller 101 calculates the throughput prediction values.

Moreover, the methods described above may be used for the determination methods for the ABS ratio and the ABS pattern.

Forth Embodiment

In a fourth embodiment, the ABS is determined in consideration of QoS (Quality of Service) of users. QoS is formed of QoS class identifiers (QCI) indicating service types and delay time to be requested, the maximum bit rate, and the average bit rate, for example. These items of information are informed from an upper node such as a mobility management entity to a base station for every service type (or a bearer), or every user. The delay time and the bit rate may be calculated from a remaining buffer quantity in the base station, for example.

Figure 23:
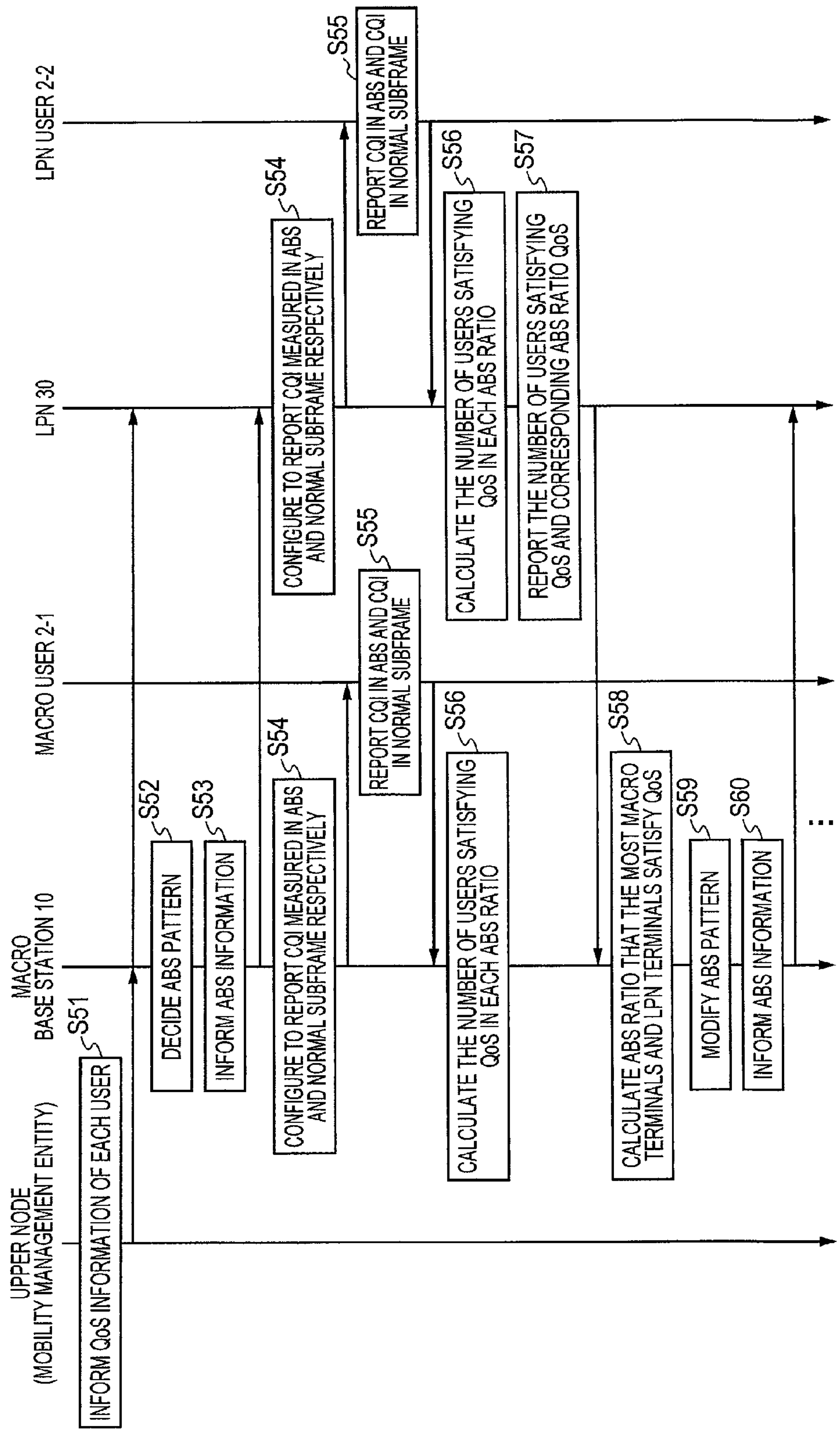
FIG. 23 is a diagram of an exemplary operation procedure of a system according to a fourth embodiment.

FIG. 23 is an exemplary operation procedure according to the fourth embodiment. A macro base station 10 and an LPN 30 are informed of information about the QoS of a macro user 2-1 and the QoS of an LPN user 2-2 from an upper node (S51). The macro base station 10 decides the ABS pattern, and informs information about the ABS to the LPN 30 (S52 and S53). The macro base station 10 and the LPN 30 configure the macro user 2-1 and the LPN user 2-2 to report the CQI measured in the ABS and the normal subframe (S54). The macro user 2-1 and the LPN user 2-2 measure the ABS CQI and the normal subframe CQI, and report the CQIs to the macro base station 10 or the LPN 30 to which the macro user 2-1 and the LPN user 2-2 are connected (S55). The macro base station 10 and the LPN 30 use the QoS information of the users reported from the upper node and the CQIs reported from the users to calculate the relationship between the ABS ratio and the number of users to satisfy QoS (S56). More specifically, such a configuration may be possible in which the relationship between the ABS ratios and the throughput prediction values of the users is calculated using Equations (25) and (26) and the like and it is determined whether to satisfy QoS from the throughput and the delay time requested from the users, for example. The LPN 30 reports the relationship between the ABS ratio and the number of users to satisfy QoS to the macro base station 10 (S57).

The information in Step S57 is reported in a format as illustrated in FIG. 24, for example. FIG. 24 is configured of the ABS ratio, the number of LPN users to satisfy QoS, and the number of the entire users connected to the LPN 30. Information about the number of LPN users to satisfy QoS to all the ABS ratios may be reported as in FIG. 24, or only information about the ABS ratio requested from the macro base station 10 may be reported. The macro base station 10 uses the information reported from the LPN 30 in Step S57 and the relationship between the ABS ratio and the number of macro users to satisfy QoS calculated in Step S56 to calculate the ABS ratio at which the largest number of users satisfy QoS in total of the macro base station 10 and the LPN 30 (S58). In the case where the ABS ratio calculated in Step S58 is different from the present ABS ratio, the ABS pattern is modified (S59), and the changed ABS information is informed to the LPN 30 (S60).

The fourth embodiment may include the ABS controller 101. In this case, the macro base station 10 and the LPN 30 report the relationship between the ABS ratio and the number of users to satisfy QoS to the ABS controller 101. Moreover, such a configuration may be possible in which the ABS CQI and the normal subframe CQI of the users and the QoS information of the users are gathered at the macro base station 10 or the ABS controller 101 and the macro base station 10 or the ABS controller 101 calculates the relationship between the ABS ratio and the number of users to satisfy QoS.

Fifth Embodiment

Figure 25:
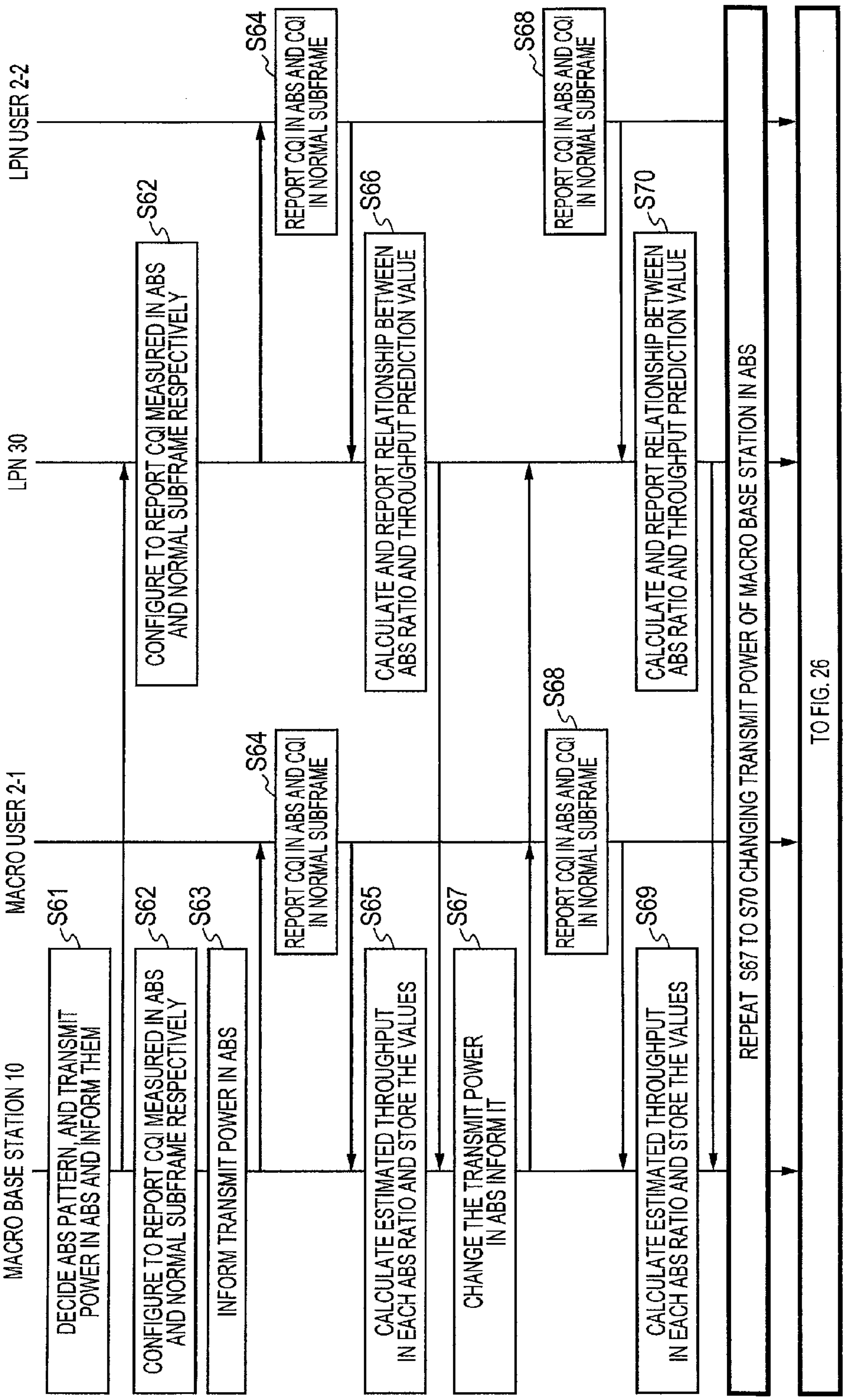
FIG. 25 is a diagram of an exemplary operation procedure of a system according to a fifth embodiment.
Figure 26:
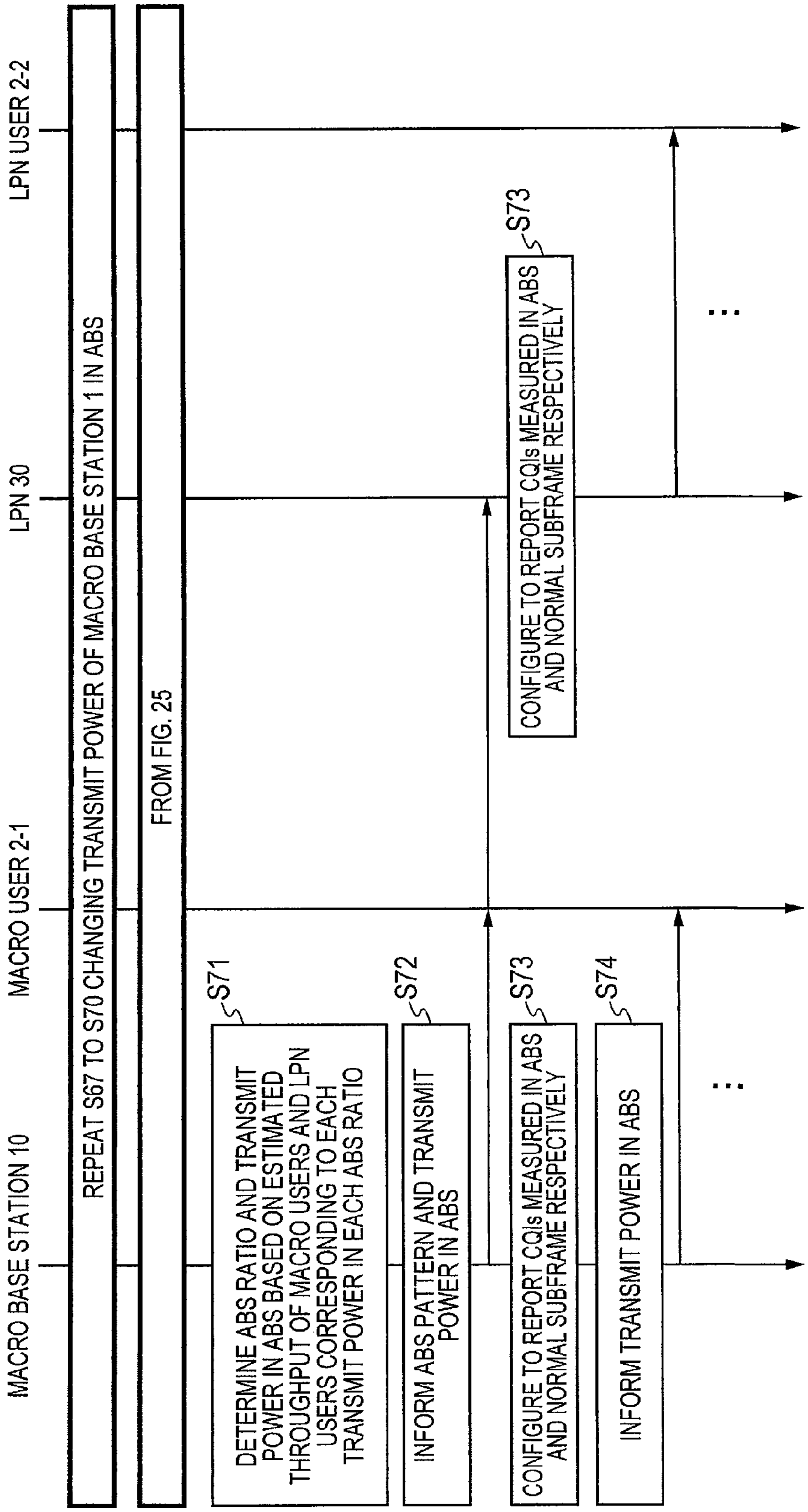
FIG. 26 is a diagram of another exemplary operation procedure of the system according to the fifth embodiment.

In a fifth embodiment, the purpose is to optimize transmission power of a macro base station 10 in the ABS, in addition to the ABS ratio of the macro base station 10. FIGS. 25 and 26 are an exemplary operation procedure according to the fifth embodiment.

First, the macro base station 10 decides the initial ABS pattern and transmission power in the ABS, and informs them to an LPN 30 (S61). Transmission power in the ABS is not necessarily informed to an LPN 30. However, desirably, the fact that transmission power is changed is informed. The macro base station 10 and the LPN 30 then configure the users to report the CQI measured in the ABS and the normal subframe (S62). The transmission power of the macro base station 10 in the ABS is necessary in order that the macro user 2-1 calculates the CQI, so that the macro base station 10 also informs transmission power in the ABS, or a difference between transmission power for the reference signal and transmission power for the data signal to the macro user 2-1 (S63). In addition to this, information described in FIG. 8 may be informed. The macro user 2-1 and the LPN user 2-2 calculate the ABS CQI and the normal subframe CQI, and report the CQIs to the macro base station 10 or the LPN 30 to which the macro user 2-1 and the LPN user 2-2 are connected (S64). The macro base station 10 uses the CQIs reported in Step S64, and calculates and stores the relationship between the ABS ratio and the throughput prediction value in the set value of the present ABS transmission power (S65). The LPN 30 calculates the relationship between the ABS ratio and the throughput prediction value, and reports the relationship to the macro base station 10 (S66). In Step S66, such a configuration may be possible in which the ABS CQI and the normal subframe CQI of the LPN user 2-2 are reported from the LPN 30 to the macro base station 10 and the macro base station 10 calculates the throughput prediction values of the LPN users 2-2. Moreover, Equations (25) and (26), for example, may be used for the calculation methods for the throughput prediction values.

Subsequently, after receiving information about the throughput prediction values from the LPN 30, the macro base station 10 changes transmission power in the ABS, and informs the information to the macro user 2-1 and the LPN 30 (S67). As similar to Step S64, the macro base station 10 and the LPN 30 then collect the CQIs from the users (S68). Similarly to Step S65, the macro base station 10 calculates and stores the throughput prediction value in transmission power in the ABS changed in Step S67 (S69). Similarly to Step S66, the LPN 30 also calculates the throughput prediction values, and reports the values to the macro base station 10 (S70). The macro base station 10 again changes transmission power in the ABS, and repeats the operations in Steps S67 to S70. With the operations as described above, the macro base station 10 can acquire transmission power of the macro base station 10 in the ABS, and the relationship between the ABS ratios and the throughput prediction values of the macro user 2-1 and the LPN user 2-2. However, since information necessary to calculate these items of information is the normal subframe CQI of the macro user 2-1 and the LPN user 2-2 and the ABS CQI in the case where the ABS transmission power is changed, the information may be acquired according to some methods. For example, such a method can be applied in which the CQI in transmission power in an ABS and the CQI in transmission power in a normal subframe are acquired, the CQIs are corrected from ABS transmission power and normal subframe transmission power, and the CQI in transmission power in a given ABS is calculated.

Subsequently, the macro base station 10 determines transmission power of the macro base station 10 in the ABS and the ABS ratio (and the ABS pattern) based on transmission power of the macro base station 10 in the ABS, the ABS ratio, and the throughput prediction values of the macro user 2-1 and the LPN user 2-2 acquired in the operations in FIG. 25 (S71). For a specific method, as described in FIG. 17, such a method can be considered that transmission power and the ABS ratio are determined in which the average throughput or the minimum throughput of all the users including the macro user 2-1 and the LPN user 2-2 is at the maximum, for example. However, transmission power and the ABS ratio may be determined according to other given criteria. Subsequently, the macro base station 10 informs the ABS pattern and transmission power in the ABS determined in Step S71 to the LPN 30 (S72). The macro base station 10 and the LPN 30 configure the macro user 2-1 and the LPN user 2-2 to report the CQI measured in the ABS and the normal subframe determined in Step S71 (S73). Transmission power after changed is also informed to the macro user 2-1 (S74). After that, the macro base station 10 and the LPN 30 communicate with each other in transmission power and the ABS pattern decided in Step S71. Moreover, the operations in FIGS. 25 and 26 are periodically performed, and ABS transmission power and the ABS pattern are updated.

It is noted that the present invention is not limited to the aforementioned embodiments, and the present invention includes various exemplary modifications. For example, the aforementioned embodiments are described in detail for easily describing the present invention, and the present invention is not necessarily limited to those including all the configurations of the description. Moreover, a part of the configuration of an embodiment can be replaced with the configuration of another embodiment. Furthermore, the configuration of another embodiment can be added to the configuration of an embodiment. In addition, another configuration can be added to, deleted from, and replaced with a part of the configurations of the embodiments.

Moreover, the configurations, the functionalities, the processing unit, the processing units, and the like described above may be implemented by hardware by designing some or all of them in an integrated circuit, for example. Furthermore, the configurations, the functionalities, and the like described above are described as the case is illustrated where they are implemented by software by executing programs to implement the functionalities of the components, for example. However, information such as programs, tables, and files to implement the functionalities can be stored in a memory as well as in a recording device such as a hard disk and an SSD (Solid State Drive), or in a recording medium such as an IC card and a DVD, or can be downloaded and installed via a network, for example, as necessary.

The invention claimed is:

1. A wireless communication system comprising:

a first base station causing interference to other base stations;

one or a plurality of second base stations subjected to interference from the first base station;

a setting unit configured to set a first time period and a second time period, the first time period in which the first base station transmits data, or transmits data in general transmission power, the second time period in which the first base station stops transmission of data, or reduces transmission power; and a determination unit configured to determine a ratio of the second time period based on communication quality in the first time period and communication quality in the second time period of a user connected to the first base station and the second base station.

2. The wireless communication system according to claim 1, wherein a pattern of the first time period and the second time period is determined based on communication quality in the first time period and communication quality in the second time period of a user connected to the first base station and the second base station.

3. The wireless communication system according to claim 2, wherein the second base station calculates a ratio of the second time period and a throughput prediction value of a user connected to the second base station based on communication quality in the first time period and communication quality in the second time period of the user connected to the second base station; and the second base station informs, to the first base station, a relationship between a ratio of the second time period and a throughput prediction value of the user connected to the second base station.

4. The wireless communication system according to claim 3, wherein the first base station calculates a ratio of the second time period and a throughput prediction value of a user connected to the first base station based on communication quality in the first time period and communication quality in the second time period of the user connected to the first base station; and the first base station determines a ratio of the second time period, and a pattern of the first time period and the second time period based on a relationship between a ratio of the second time period and a throughput prediction value of a user connected to the first and second base stations.

5. The wireless communication system according to claim 1, wherein the second base station informs communication quality in the first time period and communication quality in the second time period of a user connected to the second base station to the first base station.

6. The wireless communication system according to claim 1, wherein the first base station determines a ratio of the second time period and a pattern of the first time period and the second time period at which average throughput or minimum throughput of a user connected to the first base station and a user connected to the second base station is maximum.

7. The wireless communication system according to claim 1, wherein a ratio of the second time period and a pattern of the first time period and the second time period are determined based on a relationship between a ratio of the second time period and the numbers of users to satisfy QoS (Quality of Service) in the first base station and the second base station based on communication quality in the first time period and communication quality in the second time period of a user connected to the first base station and the second base station.

8. The wireless communication system according to claim 3, wherein the first base station requests the second base station to report a throughput prediction value to a predetermined ratio of the second time period; and the second base station informs a throughput prediction value to a ratio of the second time period to the first base station when the request is received from the first base station.

9. The wireless communication system according to claim 1, further comprising a controller different from the first base station or the second base station, wherein the controller determines a ratio of the second time period.

10. The wireless communication system according to claim 1, wherein in determining a ratio of the second time period, a plurality of ways of transmission power of the first base station in the second time period are used as well as communication quality in the first time period and communication quality in the second time period of a user connected to the first base station and the second base station.

11. The wireless communication system according to claim 1, wherein a ratio of the second time period is changed when a resource usage ratio of one of the first base station and the second base station is greater than a threshold.

12. A second base station subjected to interference from a first base station causing interference to other base stations, wherein based on communication quality in a first time period and communication quality in a second time period of a user connected to the second base station, the first time period in which the first base station transmits data, or transmits data in general transmission power, the second time period in which the first base station stops transmission of data, or reduces transmission power, the second base station calculates a ratio of the second time period and a throughput prediction value of the user connected to the second base station; and the second base station informs, to the first base station, a relationship between a ratio of the second time period and a throughput prediction value of the user connected to the second base station.

13. The second base station according to claim 12, wherein when the first base station requests the second base station to report a throughput prediction value to a predetermined ratio of the second time period, the second base station informs a throughput prediction value to a ratio of the second time period to the first base station.

14. The second base station according to claim 12, wherein a ratio of the second time period is changed when a wireless resource usage ratio of the second base station is greater than a predetermined threshold.

15. An interference control method for a first base station causing interference to other base stations, wherein the first base station sets a first time period and a second time period, the first time period in which data is transmitted, or data is transmitted in general transmission power, the second time period in which transmission of data is stopped, or transmission power is reduced;

the first base station informs, to a user connected to the first base station, one item or a plurality of items of information about a time period to measure communication quality in the second time period, transmission power of the first base station in the second time period, a ratio between transmission power for a reference signal of the first base station in the first time period and transmission power of the first base station in the second time period, and a reference signal to measure communication quality in the second time period;

the first base station receives, from the user connected to the first base station, communication quality in the first time period and communication quality in the second time period measured based on the information at the user; and the first base station performs scheduling of the user connected to the first base station based on the received communication quality in the first time period and communication quality in the second time period.

* * * * *